(12) United States Patent
Dong

(10) Patent No.: US 12,538,094 B2
(45) Date of Patent: Jan. 27, 2026

(54) RANGING CAPACITY REQUEST METHOD, RANGING CAPACITY SENDING METHOD, AND RANGING CAPACITY RECEIVING METHOD

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 376 days.

(21) Appl. No.: 18/018,239

(22) PCT Filed: Aug. 19, 2020

(86) PCT No.: PCT/CN2020/110107
§ 371 (c)(1),
(2) Date: Jan. 26, 2023

(87) PCT Pub. No.: WO2022/036609
PCT Pub. Date: Feb. 24, 2022

(65) Prior Publication Data
US 2023/0217212 A1    Jul. 6, 2023

(51) Int. Cl.
*H04W 4/02*   (2018.01)
*H04W 8/22*   (2009.01)
*H04W 88/02*  (2009.01)

(52) U.S. Cl.
CPC .............. *H04W 4/023* (2013.01); *H04W 8/22* (2013.01); *H04W 88/02* (2013.01)

(58) Field of Classification Search
CPC ................................ H04W 4/023; H04W 8/22
See application file for complete search history.

(56) References Cited

U.S. PATENT DOCUMENTS

| | | |
|---|---|---|
| 2017/0086024 A1 | 3/2017 | Do |
| 2017/0295248 A1 | 10/2017 | Fujishiro et al. |
| 2018/0227702 A1 | 8/2018 | Bitra et al. |

(Continued)

FOREIGN PATENT DOCUMENTS

| | | |
|---|---|---|
| CN | 101341685 A | 1/2009 |
| CN | 108027432 A | 5/2018 |

(Continued)

OTHER PUBLICATIONS

PCT/CN2020/110107 English translation of International Search Report dated May 17, 2021, 2 pages.

(Continued)

*Primary Examiner* — Erika A Washington
(74) *Attorney, Agent, or Firm* — Cozen O'Connor

(57) ABSTRACT

A ranging capacity request method includes sending a first message, in which the first message includes request information, and the request information is configured to request for ranging capacity information of a second terminal that has received the request information. The second terminal may reply with a message including the ranging capacity information of the second terminal, for example, a ranging process used when performing a ranging service, an object ranged when performing a ranging service, or a ranging accuracy when performing a ranging service.

20 Claims, 10 Drawing Sheets sending a first message, in which the first message includes request information, and the request information is configured to request for ranging capacity information of a second terminal that has received the request information — S101 receiving a second message sent by the second terminal, in which the second message includes the ranging capacity information of the second terminal — S102 determining whether to perform a ranging-based service with the second terminal according to the ranging capacity information of the second terminal — S103

(56) References Cited

U.S. PATENT DOCUMENTS

2018/0239008 A1  8/2018  Han et al.

FOREIGN PATENT DOCUMENTS

| CN | 111066335 A | * | 4/2020 | ........... B60R 25/246 |
| EP | 3199974 A1 | | 8/2017 | |

OTHER PUBLICATIONS

Indian Patent Application No. 202347006807, Office Action dated Jul. 7, 2023, 5 pages.
European Patent Application No. 20949820.3 Search Report dated Apr. 19, 2024, 10 pages.
Indian Patent Application No. 202347006807 Office Action dated Jun. 26, 2024, 2 pages.
Chinese Patent Application No. 202080001989.1 Third Office Action dated May 1, 2024, 8 pages.
Chinese Patent Application No. 202080001989.1 English translation of Third Office Action dated May 1, 2024, 7 pages.

\* cited by examiner sending a first message, in which the first message includes request information, and the request information is configured to request for ranging capacity information of a second terminal that has received the request information ~S101

FIG. 1 sending a first message, in which the first message includes request information, and the request information is configured to request for ranging capacity information of a second terminal that has received the request information ~S101 receiving a second message sent by the second terminal, in which the second message includes the ranging capacity information of the second terminal ~S102

FIG. 2 sending a first message, in which the first message includes request information, and the request information is configured to request for ranging capacity information of a second terminal that has received the request information ~S101 receiving a second message sent by the second terminal, in which the second message includes the ranging capacity information of the second terminal ~S102 determining whether to perform a ranging-based service with the second terminal according to the ranging capacity information of the second terminal ~S103

FIG. 3 receiving a third message sent by a third terminal, in which the third message includes ranging capacity information of the third terminal ~S401

FIG. 12 receiving a third message sent by a third terminal, in which the third message includes ranging capacity information of the third terminal ~S401 determining whether to perform a ranging-based service with the third terminal according to the ranging capacity information of the third terminal ~S402

FIG. 13 receiving a third message sent by a third terminal, in which the third message includes ranging capacity information of the third terminal ~S401 determining to perform the ranging-based service with the third terminal in response to the ranging capacity information of the fourth terminal fully matching the ranging capacity information of the third terminal; or determining to perform the ranging-based service with the third terminal in response to the ranging capacity information of the fourth terminal partially matching the ranging capacity information of the third terminal ~S4021

FIG. 14

RANGING CAPACITY REQUEST METHOD, RANGING CAPACITY SENDING METHOD, AND RANGING CAPACITY RECEIVING METHOD

CROSS-REFERENCE TO RELATED APPLICATION

This application is a U.S. national stage application of International Application No. PCT/CN2020/110107, filed Aug. 19, 2020, the entire contents of which are incorporated herein by reference.

FIELD

The present disclosure relates to the technical field of wireless communication, and in particular, to a ranging capacity request method, a ranging capacity sending method, a ranging capacity receiving method, an electronic device, and a computer-readable storage medium.

BACKGROUND

A ranging-based service mainly involve interactions of terminals to determine information such as a distance and an angle between devices. The ranging-based service may be applied in fields such as social networking, consumption such as meter reading, smart home or Internet of Things, or modern industrial applications. For example, the ranging-based service may be specifically applied in game interaction, music sharing, searching for objects/people, smart home control or other scenarios.

Devices need to go through three processes of device discovery, device ranging, and device communication in order to perform a ranging-based service. However, there is no good way to implement the process of the device discovery at present.

SUMMARY

According to a first aspect of embodiments of the present disclosure, there is provided a ranging capacity request method, which is applied to a first terminal. The method includes sending a first message, in which the first message includes request information, and the request information is configured to request for ranging capacity information of a second terminal that has received the request information.

According to a second aspect of embodiments of the present disclosure, there is provided a ranging capacity sending method, which is applied to a second terminal. The method includes sending a second message, in which the second message includes ranging capacity information of the second terminal.

According to a third aspect of embodiments of the present disclosure, there is provided a ranging capacity receiving method, which is applied to a fourth terminal. The method includes receiving a third message sent by a third terminal, in which the third message includes ranging capacity information of the third terminal.

According to a fourth aspect of embodiments of the present disclosure, there is provided an electronic device, including a processor; and a memory for storing instructions executable by the processor; in which the processor is configured to implement the ranging capacity request method described in any one of the above-mentioned embodiments, and/or the ranging capacity sending method described in any one of the above-mentioned embodiments, and/or the ranging capacity receiving method described in any one of the above-mentioned embodiments.

According to a fifth aspect of embodiments of the present disclosure, there is provided a computer-readable storage medium having stored therein computer programs that, when executed by a processor, cause the steps in the ranging capacity request method described in any one of the above-mentioned embodiments, and/or the ranging capacity sending method described in any one of the above-mentioned embodiments, and/or the ranging capacity receiving method described in any one of the above-mentioned embodiments to be implemented.

BRIEF DESCRIPTION OF THE DRAWINGS

In order to illustrate the technical solutions in embodiments of the present disclosure more clearly, accompanying drawings that will be used in the descriptions of embodiments will be briefly introduced below. Apparently, the accompanying drawings in the following description only involve some embodiments of the present disclosure. For those skilled in the art, other accompanying drawings may be obtained based on these accompanying drawings without creative labor.

FIG. 1 is a schematic flow chart showing a ranging capacity request method according to embodiments of the present disclosure.

FIG. 2 is a schematic flow chart showing a ranging capacity request method according to embodiments of the present disclosure.

FIG. 3 is a schematic flow chart showing a ranging capacity request method according to embodiments of the present disclosure.

FIG. 12 is a schematic flow chart showing a ranging capacity receiving method according to embodiments of the present disclosure.

FIG. 13 is a schematic flow chart showing a ranging capacity receiving method according to embodiments of the present disclosure.

FIG. 14 is a schematic flow chart showing a ranging capacity receiving method according to embodiments of the present disclosure.

DETAILED DESCRIPTION

Figure 4:
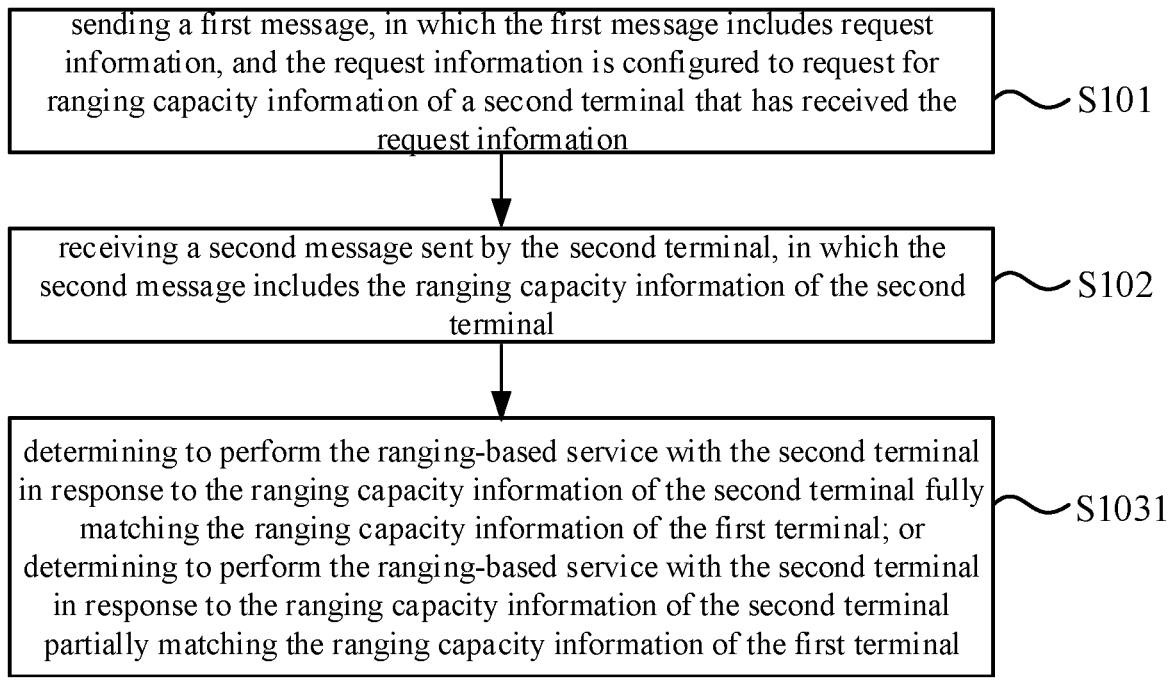
FIG. 4 is a schematic flow chart showing a ranging capacity request method according to embodiments of the present disclosure.

The technical solutions in embodiments of the present disclosure will be clearly and completely described below with reference to accompanying drawings involved in embodiments of the present disclosure. Apparently, the described embodiments are only part of the embodiments of the present disclosure, not all of the embodiments. All other embodiments obtained by those skilled in the art based on the embodiments in the present disclosure without creative labor shall fall within the protection scope of the present disclosure.

Embodiments of the present disclosure provide a ranging capacity request method, a ranging capacity sending method, a ranging capacity receiving method, a ranging capacity request apparatus, a ranging capacity sending apparatus, a ranging capacity receiving apparatus, an electronic device, and a computer-readable storage medium to solve technical problems in the related art.

FIG. 1 is a schematic flow chart showing a ranging capacity request method according to an embodiment of the present disclosure. The method described in this embodiment may be applied to a first terminal. The first terminal includes, but is not limited to, an electronic device such as a mobile phone, a tablet computer, a wearable device, a sensor, and an Internet of Things device, etc. A second terminal mentioned in the following embodiments may be the second terminal to which the ranging capacity sending method described subsequently is applied.

The first terminal may perform a ranging-based service, and the ranging-based service includes, but is not limited to, measuring a distance relative to other terminal(s), measuring an angle relative to other terminal(s), measuring a distance and an angle relative to other terminal(s), and measuring a relative position with other terminal(s), etc.

However, to perform the ranging-based service, other device(s) is/are required to participate, so the first terminal needs to first discover other device(s) nearby that can also perform the ranging-based service. Based on the following embodiments, the first terminal can discover other device(s) nearby that can also perform the ranging-based service, such as the second terminal. In the ranging-based service, the first terminal may be referred to as a discovery device, or a broadcast announcing device, and the second terminal may be referred to as a discoveree device, or a monitoring/listening device.

As shown in FIG. 1, the ranging capacity request method includes a step S101.

In step S101, a first message is sent. The first message includes request information, and the request information is configured to request for ranging capacity information of a second terminal that has received the request information.

In an embodiment, since the first terminal does not know which terminals exist nearby, nor does it know which terminals nearby support the ranging-based service. Therefore, the first terminal may send the first message, for example broadcast the first message to ensure that all terminals nearby can receive the first message.

The first message may carry the request information, and the request information is configured to request for the ranging capacity information of the second terminal that has received the request information. The second terminal does not specifically refer to a certain terminal, but refers to a terminal that has received the request information nearby the first terminal.

If the second terminal supports the ranging-based service, the second terminal may send a second message to the first terminal based on the request after receiving the first message. The second message includes the ranging capacity information of the second terminal.

In an embodiment, the ranging capacity information includes at least one of the following: a ranging process used when performing a ranging service, an object ranged when performing a ranging service, or a ranging accuracy when performing a ranging service.

The ranging process includes, but is not limited to, a one way process (i.e., only one of the first terminal and the second terminal needs to perform ranging), a two way process (i.e., the first terminal and the second terminal perform the ranging, respectively). The object ranged includes, but is not limited to, a distance (such as a distance between the first terminal and the second terminal), an angle (such as an angle of the first terminal relative to the second terminal), a relative position (such as a position of the first terminal relative to the second terminal). The ranging accuracy may be set as required, for example, for the distance, the ranging accuracy may be millimeter, centimeter, and the like.

Further, after receiving the ranging capacity information of the second terminal, the first terminal may determine that the second terminal can perform the ranging-based service, and may also determine which ranging capacity information the second terminal supports according to the ranging capacity information of the second terminal, so that when needs to perform the ranging-based service with the second terminal subsequently, the first terminal may select the ranging capacity information supported by the second terminal from the ranging capacity information of the first terminal to perform the ranging-based service with the second terminal.

According to embodiments of the present disclosure, by sending the first message carrying the request information, the first terminal may not only determine which terminals nearby can perform the ranging-based service, but also enable the second terminal that supports the ranging-based service to send the ranging capacity information of the second terminal to the first terminal, such that the first terminal may determine, according to the ranging capacity information, which ranging capacity to be used subsequently to perform the ranging-based service with the second terminal, so as to perform the ranging-based service with the second terminal.

In an embodiment, the first terminal may initiate the ranging-based service through a target application, and the first terminal may be triggered to send the first message in response to determining that the target application initiates the ranging-based service. The request information may represent an identifier of the target application, an information element in the first message, or the identifier of the target application and the information element. After receiving the first message, the second terminal may determine, based on the identifier of the target application and/or the information element, that the first terminal needs to perform the ranging-based service, and then sends the second message to the first terminal.

FIG. 2 is a schematic flow chart showing a ranging capacity request method according to embodiments of the present disclosure. As shown in FIG. 2, the method further includes a step S102.

In step S102, a second message sent by the second terminal is received. The second message includes the ranging capacity information of the second terminal.

In an embodiment, after receiving the first message sent by the first terminal, if the second terminal can perform the ranging-based service, the second terminal may send the ranging capacity information to the first terminal in response to the request information in the first message. The ranging capacity information may be carried in the second message and sent to the first terminal. In addition to the ranging capacity information, the second message may also carry other information, such as an identifier of the second terminal and the like.

It is to be noted that, when there is no second terminal nearby the first terminal, or although there is a second terminal nearby the first terminal, but the second terminal cannot perform the ranging-based service, then the step S102 may not be performed.

FIG. 3 is a schematic flow chart showing a ranging capacity request method according to embodiments of the present disclosure. As shown in FIG. 3, the method further includes a step S103.

In step S103, it is determined whether to perform a ranging-based service with the second terminal according to the ranging capacity information of the second terminal.

In an embodiment, after receiving the ranging capacity information of the second terminal, the first terminal may determine whether to perform the ranging-based service with the second terminal according to the ranging capacity information of the second terminal. For example, the ranging capacity information of the second terminal may be compared with the ranging capacity information of the first terminal, and then it is determined whether to perform the ranging-based service with the second terminal based on a comparison result.

FIG. 4 is a schematic flow chart showing a ranging capacity request method according to embodiments of the present disclosure. As shown in FIG. 4, determining whether to perform the ranging-based service with the second terminal according to the ranging capacity information of the second terminal includes a step S1031.

In step S1031, the first terminal determines to perform the ranging-based service with the second terminal in response to the ranging capacity information of the second terminal completely matching the ranging capacity information of the first terminal; or determines to perform the ranging-based service with the second terminal in response to the ranging capacity information of the second terminal partially matching the ranging capacity information of the first terminal.

In an embodiment, the first terminal may compare the ranging capacity information of the second terminal with the ranging capacity information of the first terminal, and determine a matching degree between the ranging capacity information of the second terminal and the ranging capacity information of the first terminal according to the comparison result.

The first terminal may choose to perform the ranging-based service with the second terminal in the case where the ranging capacity information of the second terminal completely matches the ranging capacity information of the first terminal. Alternatively, the first terminal may choose to perform the ranging-based service with the second terminal in the case where the ranging capacity information of the second terminal partially matches the ranging capacity information of the first terminal.

In an embodiment, the first terminal may determine not to perform the ranging-based service with the second terminal in the case where the ranging capacity information of the second terminal is completely different from the ranging capacity information of the first terminal, and/or, the first terminal may generate prompt information and send the prompt information to the second terminal to prompt the second terminal that the ranging capacity information of the second terminal is completely different from the ranging capacity information of the first terminal, so that the second terminal may determine the reason why the first terminal does not perform the ranging-based service with the second terminal is that the ranging capacity information of the second terminal is completely different from the ranging capacity information of the first terminal.

Figure 5:
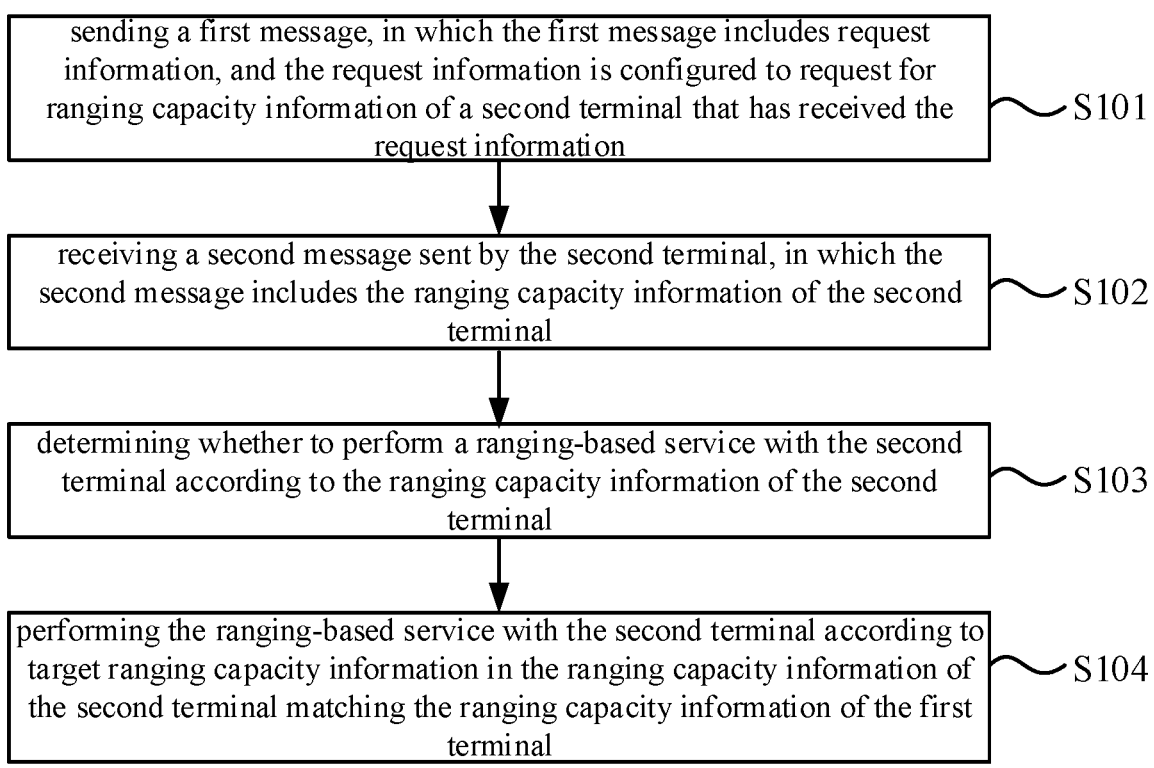
FIG. 5 is a schematic flow chart showing a ranging capacity request method according to embodiments of the present disclosure.

FIG. 5 is a schematic flow chart showing a ranging capacity request method according to embodiments of the present disclosure. As shown in FIG. 5, the method further includes a step S104.

In step S104, the ranging-based service is performed with the second terminal according to target ranging capacity information in the ranging capacity information of the second terminal matching the ranging capacity information of the first terminal.

In an embodiment, when the first terminal determines to perform the ranging-based service with the second terminal, the first terminal may perform the ranging-based service with the second terminal according to the target ranging capacity information in the ranging capacity information of the second terminal matching the ranging capacity information of the first terminal.

For example, the ranging capacity information of the second terminal includes that the ranging process is the one way process, the ranged object is the distance, and the ranging accuracy is centimeter. The ranging capacity information of the first terminal includes that the ranging process is the two way process, the ranged object is the distance, and the ranging accuracy is millimeter. It may be determined that the ranging capacity information of the second terminal partially matches the ranging capacity information of the first terminal, that is, the ranged object of the first terminal matches the ranged object of the second terminal, both being the distance.

For example, the ranging capacity information of the second terminal includes the ranged object being the distance and the angle. The ranging capacity information of the first terminal includes the ranged object being the distance. It may be determined that the ranging capacity information of the second terminal partially matches the ranging capacity information of the first terminal, specifically, the ranged object of both the first terminal and the second terminal includes the distance.

In this case, if the first terminal determines to perform the ranging-based service with the second terminal, the first terminal may perform the ranging-based service with the second terminal according to the target ranging capacity information (i.e., the ranged object being the distance) in the ranging capacity information of the second terminal matching the ranging capacity information of the first terminal. Therefore, when the first terminal performs the ranging-based service, the first terminal may measure a distance with the second terminal based on the ranging. Different ranging capacity information regarding such as the ranging process and the ranging accuracy may be determined by negotiation between the first terminal and the second terminal through their flows thereof.

It is to be noted that a specific meaning of matching in all embodiments of the present disclosure may refer to same or similar.

For example, the meaning of matching is the same. For example, the ranging capacity information of the first terminal includes the ranged object, and the ranging capacity information of the second terminal includes the ranged object, that is to say, the ranged objects of both the first terminal and the second terminal are distance, then it may be determined that the ranging capacity information of the first terminal matches the ranging capacity information of the second terminal.

For example, the meaning of matching is the similar. For example, the ranging capacity information of the first terminal includes the ranging accuracy, and the ranging capacity information of the second terminal includes the ranging accuracy, then a ratio between the ranging accuracy of the first terminal and the ranging accuracy of the second terminal may be determined, and when the ratio is within a preset range, it may be determined that the ranging capacity information of the first terminal matches the ranging capacity information of the second terminal. For example, the ranging accuracy of the first terminal is 1 cm, the ranging accuracy of the second terminal is 1.25 cm, and the preset range is 0.5 to 2, then the ratio between the ranging accuracy of the first terminal and the ranging accuracy of the second terminal is 1 cm/1.25 cm=0.8, which is within the preset range, then it may be determined that the ranging capacity information of the first terminal matches the ranging capacity information of the second terminal.

Optionally, the first message further includes ranging capacity information of the first terminal.

The ranging capacity information of the second terminal includes target ranging capacity information in the ranging capacity information of the second terminal that matches the ranging capacity information of the first terminal.

In an embodiment, the first message may include the ranging capacity information of the first terminal in addition to the request information, and the second terminal may determine the target ranging capacity information in the ranging capacity information of the second terminal that matches the ranging capacity information of the first terminal, and then carry the target ranging capacity information in the second message and send it to the first terminal.

The ranging capacity information of the first terminal may be all ranging capacity information supported by the first terminal. For example, the ranged object supported by the first terminal includes the distance and the angle, the first terminal may carry the ranged object including the distance and the angle as the ranging capacity information of the first terminal in the first message and send it.

The second terminal may determine the target ranging capacity information in the ranging capacity information of the second terminal that matches the ranging capacity information of the first terminal. For example, the second terminal may determine, in the ranging capacity information of the second terminal, the target ranging capacity information that matches any of all the ranging capacity information supported by the first terminal, and carry it in the second message to send to the first terminal, so that the first terminal may completely know which of the ranging capacity information of the second terminal matches the ranging capacity information supported by the first terminal.

The ranging capacity information of the first terminal may be the ranging capacity information required by the ranging service to be performed by the first terminal. For example, the ranged object supported by the first terminal includes the distance and the angle, but the ranged object required by the ranging service to be performed is the distance, then the first terminal may carry the ranged object including the distance as the ranging capacity information of the first terminal in the first message and send it.

The second terminal may determine the target ranging capacity information in the ranging capacity information of the second terminal that matches the ranging capacity information of the first terminal. For example, the second terminal may determine, in the ranging capacity information of the second terminal, the target ranging capacity information that matches any of the ranging capacity information to be used by the first terminal and carry it in the second message to send to the first terminal, so that the first terminal can perform subsequent ranging-based service with the second terminal based on the target ranging capacity information.

It is to be noted that the ranging capacity information of the second terminal may be all ranging capacity information supported by the second terminal.

Optionally, the first message further includes ranging capacity information of the first terminal and an indication identifier, and the indication identifier is configured to indicate ranging capacity information to be used by the first terminal in the ranging capacity information of the first terminal.

The ranging capacity information of the second terminal includes target ranging capacity information in the ranging capacity information of the second terminal that matches the ranging capacity information to be used by the first terminal.

In an embodiment, in addition to the request information, the first message may include the ranging capacity information of the first terminal and the indication identifier. The indication identifier may indicate the ranging capacity information to be used by the first terminal in the ranging capacity information of the first terminal.

For example, the ranging capacity information of the first terminal is all ranging capacity information supported by the first terminal. For example, the ranged object supported by the first terminal includes distance and angle, but the ranged object required by the ranging service to be performed by the first terminal is distance, then the first terminal may use the first identifier to indicate that, among the distance and the angle, the ranging capacity information to be used by the first terminal is the distance.

Accordingly, after receiving the first message, the second terminal may determine the ranging capacity information to be used by the first terminal in the ranging capacity information of the first terminal according to the indication identifier in the first message, and then may determine the target ranging capacity information in the ranging capacity information of the second terminal that matches the ranging capacity information to be used by the first terminal, and send the determined target ranging capacity information to the first terminal.

On the one hand, the first terminal can subsequently perform the ranging-based service with the second terminal based on the target ranging capacity information. On the other hand, since the sent first message already contains the ranging capacity information of the first terminal, for example, the ranging capacity information of the first terminal is the ranging capacity information supported by the first terminal, the second terminal that has received the first message already knows the ranging capacity information supported by the first terminal, so when the first terminal subsequently changes the ranging capacity information to be used, it is not necessary to carry the ranging capacity information of the first terminal in the sent message, but it only needs to carry the indication identifier. For the second terminal that has received the first message, it may determine what ranging capacity information will be used by the first terminal according to the indication identifier newly received. In this way, it is beneficial to reduce the amount of information carried by the message sent by the first terminal and save communication resources.

The present disclosure also provides a ranging capacity sending method. The method described in embodiments of the present disclosure may be applied to a second terminal. The second terminal includes, but is not limited to, an electronic device, such as a mobile phone, a tablet computer, a wearable device, a sensor, an Internet of Things device, etc. A first terminal mentioned in the following embodiments may be the first terminal to which the above-mentioned ranging capacity request method is applied.

The ranging capacity sending method may include steps as follows.

A second message is sent. The second message includes ranging capacity information of the second terminal.

In an embodiment, the second terminal may communicate with the first terminal to which the above-mentioned ranging capacity request method is applied, for example, may receive a first message sent by the first terminal, in which the first message includes request information, and the request information is configured to request for ranging capacity information of the second terminal that has received the request information, and then send the second message, specifically, send the second message to the first terminal.

In an embodiment, the second terminal may communicate with a fourth terminal to which a ranging capacity receiving method described in the following is applied. In this case, the second terminal is referred to as a third terminal in order to distinguish from the above-mentioned communication between the second terminal and the first terminal.

Optionally, the second message further includes an indication identifier, and the indication identifier is configured to indicate ranging capacity information to be used by the second terminal in the ranging capacity information of the second terminal. In the case where the second terminal is the third terminal, and the second message is a third message, the third message further includes an indication identifier, and the indication identifier is configured to indicate ranging capacity information to be used by the third terminal in the ranging capacity information of the third terminal.

Taking the communication between the second terminal and the first terminal as an example, the second terminal, as a discoveree device, may receive the first message sent by the first terminal. A communication process with the first terminal may be as shown in FIG. 6, which is a schematic flow chart showing a ranging capacity sending method according to embodiments of the present disclosure.

Figure 6:
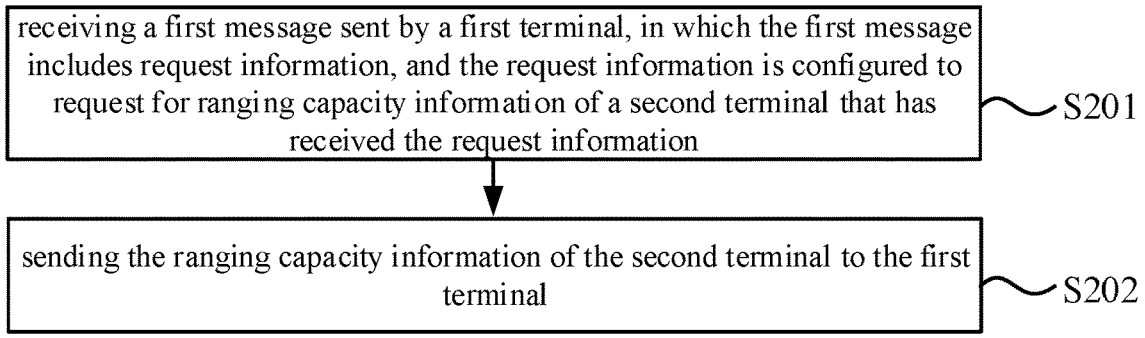
FIG. 6 is a schematic flow chart showing a ranging capacity sending method according to embodiments of the present disclosure.

As shown in FIG. 6, the ranging capacity sending method may include a step S201, and a step S202.

In step S201, a first message sent by a first terminal is received. The first message includes request information, and the request information is configured to request for the ranging capacity information of the second terminal that has received the request information. In step S202, the ranging capacity information of the second terminal is sent to the first terminal.

In an embodiment, the first terminal may send the first message by a sending way. If the second terminal supports a ranging-based service, the second terminal may send the second message to the first terminal after receiving the first message. The second message includes the ranging capacity information of the second terminal. Further, after receiving the ranging capacity information of the second terminal, the first terminal may determine that the second terminal can perform the ranging-based service, and may also determine which ranging capacity information the second terminal supports according to the ranging capacity information of the second terminal, so that when the first terminal needs to perform the ranging-based service with the second terminal subsequently, the first terminal may select the ranging capacity information supported by the second terminal to perform the ranging-based service with the second terminal.

According to embodiments of the present disclosure, the second terminal sends the ranging capacity information to the first terminal according to the request information in the first message, so that the first terminal may not only determine that the second terminal can perform the ranging-based service, but also may determine which ranging capacity information the second terminal supports according to the ranging capacity information, so that when the first terminal needs to perform the ranging-based service with the second terminal subsequently, the first terminal may select the ranging capacity information supported by the second terminal to perform the ranging-based service with the second terminal.

Optionally, the ranging capacity information includes at least one of the following: a ranging process used when performing a ranging service, an object ranged when performing a ranging service, or a ranging accuracy when performing a ranging service.

Figure 7:
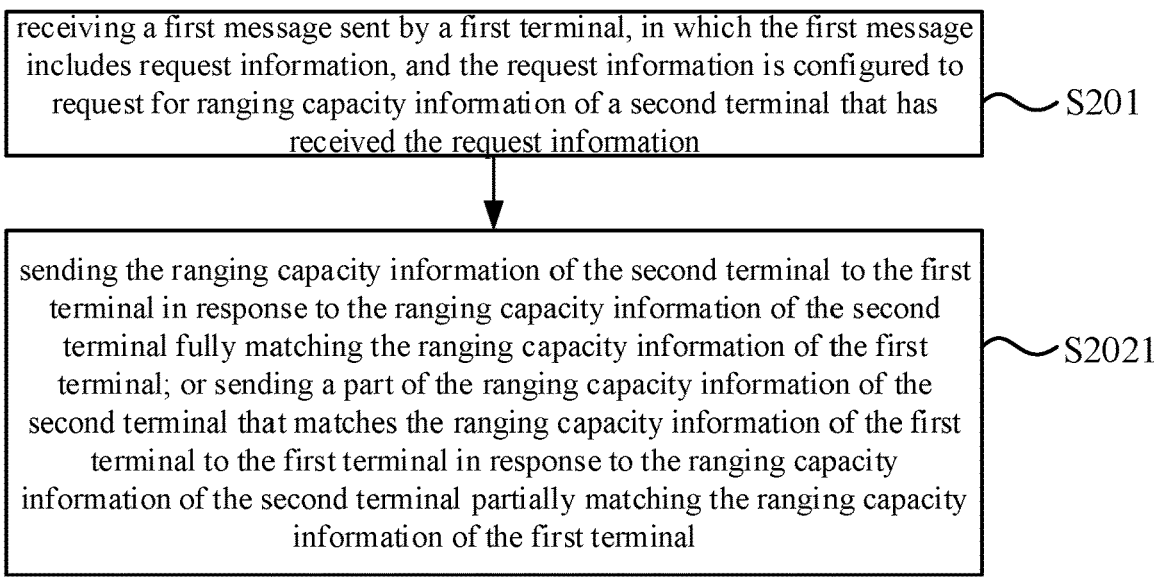
FIG. 7 is a schematic flow chart showing a ranging capacity sending method according to embodiments of the present disclosure.

FIG. 7 is a schematic flow chart showing a ranging capacity sending method according to embodiments of the present disclosure. As shown in FIG. 7, the first message further includes ranging capacity information of the first terminal, and sending the ranging capacity information of the second terminal to the first terminal includes a step S2021.

In step S2021, the ranging capacity information of the second terminal is sent to the first terminal in response to the ranging capacity information of the second terminal completely matching ranging capacity information of the first terminal; or a part of the ranging capacity information of the second terminal that matches the ranging capacity information of the first terminal is sent to the first terminal in response to the ranging capacity information of the second terminal partially matching the ranging capacity information of the first terminal.

In an embodiment, the second terminal may compare the ranging capacity information of the second terminal with the ranging capacity information of the first terminal, and determine a matching degree of the ranging capacity information of the second terminal and the ranging capacity information of the first terminal according to a comparison result.

The second terminal may choose to send the ranging capacity information of the second terminal to the first terminal in the case where the ranging capacity information of the second terminal completely matches the ranging capacity information of the first terminal. The second terminal may also choose to send the ranging capacity information of the second terminal to the first terminal in the case where the ranging capacity information of the second terminal partially matches the ranging capacity information of the first terminal.

In an embodiment, the second terminal may not send the ranging capacity information of the second terminal to the first terminal in the case where the ranging capacity information of the second terminal is completely different from the ranging capacity information of the first terminal. Optionally, the second terminal may generate prompt information and send the prompt information to the first terminal to prompt the first terminal that the ranging capacity information of the second terminal is completely different from the ranging capacity information of the first terminal. In this way, the second terminal may enable the first terminal to know that the ranging capacity information of the second terminal is completely different from the ranging capacity information of the first terminal, without sending the ranging capacity information of the second terminal to the first terminal.

Figure 8:
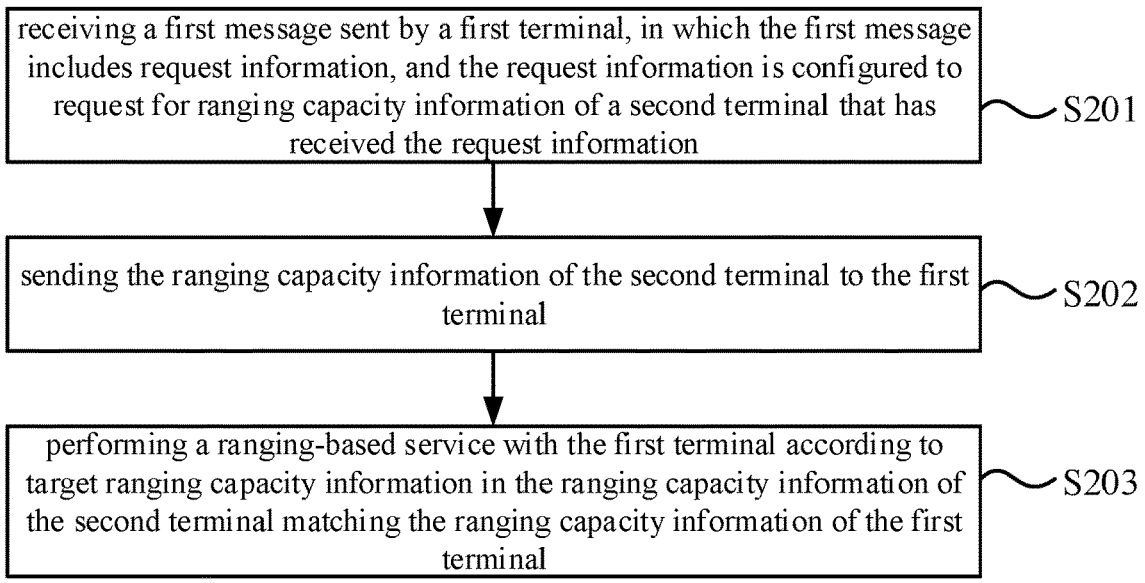
FIG. 8 is a schematic flow chart showing a ranging capacity sending method according to embodiments of the present disclosure.

FIG. 8 is a schematic flow chart showing a ranging capacity sending method according to embodiments of the present disclosure. As shown in FIG. 8, the method further includes a step S203.

In step S203, a ranging-based service with the first terminal is performed according to target ranging capacity information in the ranging capacity information of the second terminal matching the ranging capacity information of the first terminal.

In an embodiment, in response to determining that there exists the target ranging capacity information matching the ranging capacity information of the first terminal in the ranging capacity information of the second terminal, the first terminal and the second terminal may determine that both of them support the target ranging capacity information, so that the first terminal may perform the ranging-based service with the second terminal according to the target ranging capacity information, and the second terminal may also perform the ranging-based service with the first terminal according to the target ranging capacity information.

Figure 9:
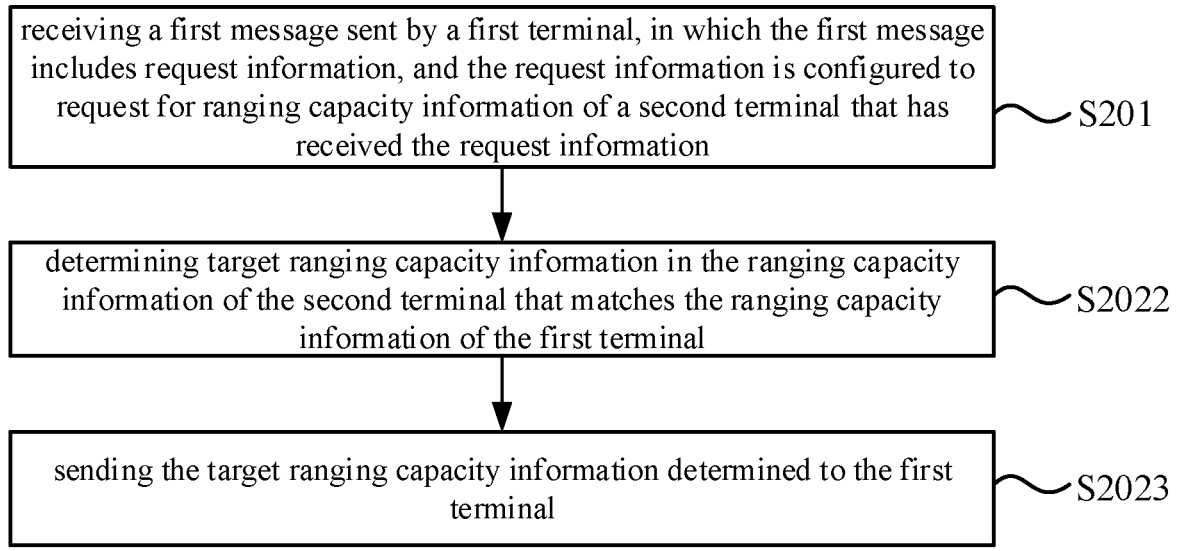
FIG. 9 is a schematic flow chart showing a ranging capacity sending method according to embodiments of the present disclosure.

FIG. 9 is a schematic flow chart showing a ranging capacity sending method according to embodiments of the present disclosure. As shown in FIG. 9, the first message further includes the ranging capacity information of the first terminal, and sending the ranging capacity information of the second terminal to the first terminal includes a step S2022, and a step S2023.

In step S2022, target ranging capacity information in the ranging capacity information of the second terminal that matches the ranging capacity information of the first terminal is determined.

In step S2023, the target ranging capacity information determined is sent to the first terminal.

In an embodiment, the first message may include the ranging capacity information of the first terminal in addition to the request information. The second terminal may determine the target ranging capacity information in the ranging capacity information of the second terminal that matches the ranging capacity information of the first terminal, and then carry the target ranging capacity information in the second message and send it to the first terminal.

The ranging capacity information of the first terminal may be all ranging capacity information supported by the first terminal. For example, the ranged object supported by the first terminal includes distance and angle, the first terminal may carry the ranging object including the distance and the angle as the ranging capacity information of the first terminal in the first terminal and sent it to the second terminal.

The second terminal may determine the target ranging capacity information in the ranging capacity information of the second terminal that matches the ranging capacity information of the first terminal. For example, the second terminal may determine, in the ranging capacity information of the second terminal, the target ranging capacity information that matches any of all the ranging capacity information supported by the first terminal, and carry it in the second message to send to the first terminal, so that the first terminal may completely know which of the ranging capacity information of the second terminal matches the ranging capacity information supported by the first terminal.

The ranging capacity information of the first terminal may be the ranging capacity information required by the ranging service to be performed by the first terminal. For example, the ranged object supported by the first terminal includes the distance and the angle, but the ranged object required by the ranging service to be performed is the distance, then the first terminal may carry the ranged object including the distance as the ranging capacity information of the first terminal in the first message and send it to the second terminal.

The second terminal may determine the target ranging capacity information in the ranging capacity information of the second terminal that matches the ranging capacity information of the first terminal. For example, the second terminal may determine, in the ranging capacity information of the second terminal, the target ranging capacity information that matches any of the ranging capacity information to be used by the first terminal, and carry it in the second message to send to the first terminal, so that the first terminal may subsequently perform the ranging-based service with the second terminal based on the target ranging capacity information.

It is to be noted that the ranging capacity information of the second terminal may be all ranging capacity information supported by the second terminal.

Figure 10:
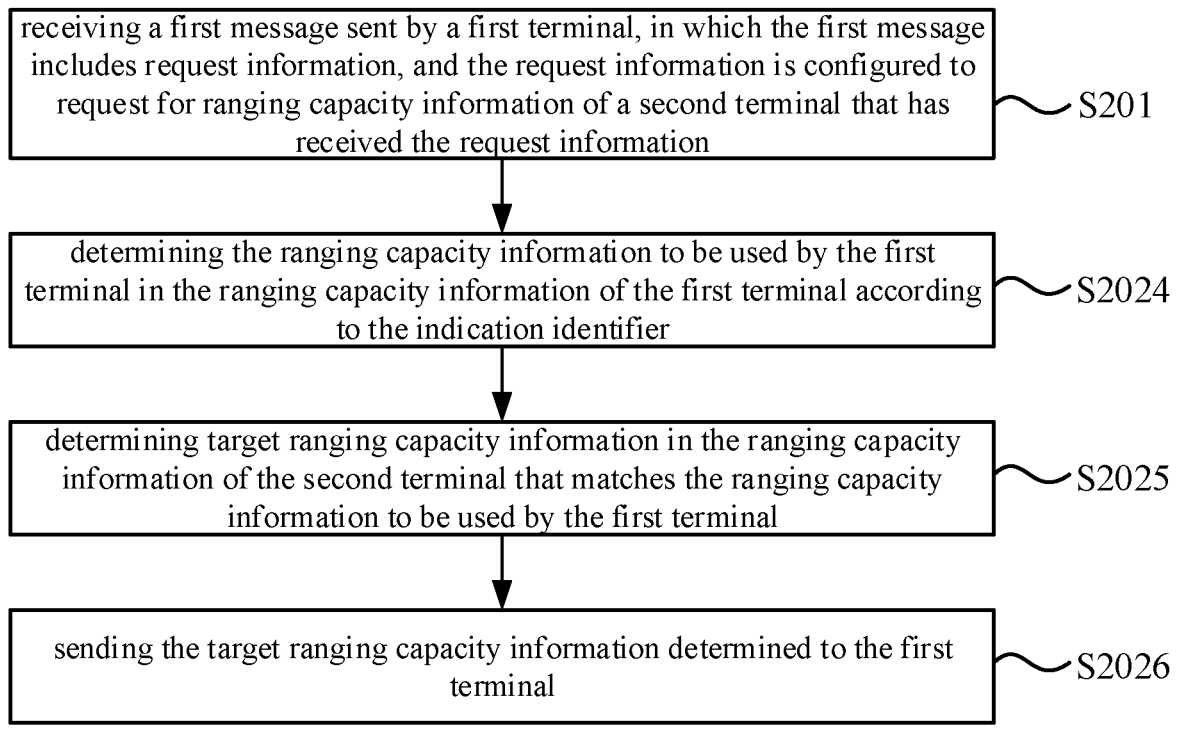
FIG. 10 is a schematic flow chart showing a ranging capacity sending method according to embodiments of the present disclosure.

FIG. 10 is a schematic flow chart showing a ranging capacity sending method according to embodiments of the present disclosure. As shown in FIG. 10, the first message further includes ranging capacity information of the first terminal and an indication identifier, and the indication identifier is configured to indicate ranging capacity information to be used by the first terminal in the ranging capacity information of the first terminal. Sending the ranging capacity information of the second terminal to the first terminal includes a step S2024, a step S2025, and a step S2026.

In step S2024, the ranging capacity information to be used by the first terminal in the ranging capacity information of the first terminal is determined according to the indication identifier.

In step S2025, target ranging capacity information in the ranging capacity information of the second terminal that matches the ranging capacity information to be used by the first terminal is determined.

In step S2026, the target ranging capacity information determined is sent to the first terminal.

In an embodiment, the first message may include the ranging capacity information of the first terminal and the indication identifier in addition to the request information. The indication identifier may indicate the ranging capacity information to be used by the first terminal in the ranging capacity information of the first terminal.

For example, the ranging capacity information of the first terminal is all ranging capacity information supported by the first terminal. For example, the ranged object supported by the first terminal includes distance and angle, but the ranged object required by the ranging service to be performed by the first terminal is distance, then the first terminal may use the first identifier to indicate that, among the distance and the angle, the ranging capacity information to be used by the first terminal is the distance.

Accordingly, after receiving the first message, the second terminal may determine the ranging capacity information to be used by the first terminal in the ranging capacity information of the first terminal according to the indication identifier in the first message, and then may determine the target ranging capacity information in the ranging capacity information of the second terminal that matches the ranging capacity information to be used by the first terminal, and send the determined target ranging capacity information to the first terminal.

On the one hand, the first terminal can subsequently perform the ranging-based service with the second terminal based on the target ranging capacity information. On the other hand, since the sent first message already contains the ranging capacity information of the first terminal, for example, the ranging capacity information of the first terminal is the ranging capacity information supported by the first terminal, the second terminal that has received the first message already knows the ranging capacity information supported by the first terminal, so when the first terminal subsequently changes the ranging capacity information to be used, it is not necessary to carry the ranging capacity information of the first terminal in the sent message, but it only needs to carry the indication identifier. For the second terminal that has received the first message, it may determine what ranging capacity information will be used by the first terminal according to the indication identifier newly received. In this way, it is beneficial to reduce the amount of information carried by the message sent by the first terminal and save communication resources.

Figure 11:
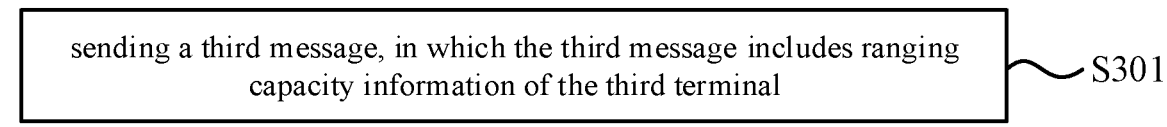
FIG. 11 is a schematic flow chart showing a ranging capacity sending method according to embodiments of the present disclosure.

In some embodiments, the second terminal is referred to as a third terminal, and the second message sent by the second terminal is referred to as a third message, and in the communication between the third terminal and a fourth terminal, the third terminal may be used as a discoveree device, and the third message may include ranging capacity information of the third terminal. FIG. 11 is a schematic flow chart showing a ranging capacity sending method according to embodiments of the present disclosure.

In the case where the third terminal can perform a ranging-based service, the ranging-based service include, but is not limited to, measuring a distance relative to other terminal(s), measuring an angle relative to other terminal(s), measuring a distance and an angle relative to other terminal(s), and measuring a relative position with other terminal(s), etc.

However, to perform the ranging-based service, other device(s) is/are required to participate, so the third terminal needs to be discovered by other device(s) nearby that can also perform the ranging-based service. Based on the following embodiments, the third terminal may enable other device(s) nearby (e.g., the fourth terminal) that can perform the ranging-based service to discover the third terminal by sending its own ranging capacity information. In the ranging-based service, the third terminal may be referred to as a discoveree device, and the fourth terminal may be referred to as a discovery device.

As shown in FIG. 11, the ranging capacity sending method may include a step S301.

In step S301, a third message is sent, and the third message includes ranging capacity information of the third terminal.

In an embodiment, since the third terminal does not know which terminals exist nearby, nor does it know which terminals nearby support the ranging-based service. Therefore, the third message may send the third message, such as broadcast the third message to ensure that all terminals nearby can receive the third message, and the third message may carry the ranging capacity information of the third terminal.

After receiving the third message, the fourth terminal nearby the third terminal may determine the ranging capacity information of the third terminal according to the third message.

In an embodiment, the ranging capacity information includes at least one of the following: a ranging process used when performing a ranging service, an object ranged when performing a ranging service, or a ranging accuracy when performing a ranging service.

The ranging process includes, but is not limited to, a one way process (i.e., only one of the third terminal and the fourth terminal needs to perform ranging), a two way process (i.e., the third terminal and the fourth terminal perform the ranging, respectively). The object ranged includes, but is not limited to, a distance (such as a distance between the third terminal and the fourth terminal), an angle (such as an angle of the fourth terminal relative to the third terminal), a relative position (such as a position of the fourth terminal relative to the third terminal). The ranging accuracy may be set as required, for example, for the distance, the ranging accuracy may be millimeter, centimeter, and the like.

Further, after receiving the ranging capacity information of the third terminal, the fourth terminal may determine that the third terminal can perform the ranging-based service, and may also determine which ranging capacity information the third terminal supports according to the ranging capacity information of the third terminal, so that when subsequently needs to perform the ranging-based service with the third terminal, the fourth terminal may select the ranging capacity information supported by the third terminal from the ranging capacity information of the fourth terminal to perform the ranging-based service with the third terminal.

According to embodiments of the present disclosure, the third terminal sends the third message carrying the ranging capacity information of the third terminal, through which the fourth terminal that can support the ranging-based service nearby the third terminal may not only determine that the third terminal can perform the ranging-based service, but also determine which ranging capacity information the third terminal supports according to the ranging capacity information of the third terminal, and then determine which ranging capacity to be used to perform the ranging-based service with the third terminal, so as to perform the ranging-based service with the third terminal.

In an embodiment, the third terminal may initiate the ranging-based service through a target application, and the third terminal may be triggered to send the third message in response to determining that the target application initiates the ranging-based service. The third message may include an identifier of the target application in the third terminal, in addition to the ranging capacity information of the third terminal. After receiving the third message, the fourth terminal may determine that the third terminal needs to perform the ranging-based service, based on the identifier of the target application and/or the ranging capacity information of the third terminal.

It is to be noted that the ranging capacity information of the third terminal may be all ranging capacity information supported by the third terminal. For example, the ranged object supported by the third terminal includes the distance and the angle, then the third terminal may carry the ranged object including the distance and the angle as the ranging capacity information of the third terminal in the third message and send it.

The ranging capacity information of the third terminal may also be the ranging capacity information required by the ranging service to be performed by the third terminal. For example, the ranged object supported by the third terminal includes the distance and the angle, but the ranged object required by the ranging service to be performed is the distance, then the third terminal may carry the ranged object including the distance as the ranging capacity information of the third terminal in the third message to send.

Optionally, the third message further includes an indication identifier, and the indication identifier is configured to indicate ranging capacity information to be used by the third terminal in the ranging capacity information of the third terminal.

In an embodiment, the third message may include the ranging capacity information of the third terminal and the indication identifier in addition to the request information. The indication identifier may indicate the ranging capacity information to be used by the third terminal in the ranging capacity information of the third terminal.

For example, the ranging capacity information of the third terminal is all ranging capacity information supported by the third terminal. For example, the ranged object supported by the third terminal include the distance and the angle, but the ranged object required by the ranging service to be performed by the third terminal is distance, then the third terminal may use a third identifier to indicate that, among the distance and the angle, the ranging capacity information to be used by the third terminal is the distance.

Accordingly, after receiving the third message, the fourth terminal may determine the ranging capacity information to be used by the third terminal in the ranging capacity information of the third terminal according to the indication identifier in the third message, so that when performing the ranging-based service with the third terminal subsequently, the fourth terminal may adopt the target ranging capacity information that matches the ranging capacity information to be used by the third terminal in the ranging capacity information of the fourth terminal to perform the ranging-based service with the third terminal to ensure the ranging-based service proceed smoothly.

On the one hand, the fourth terminal can subsequently perform the ranging-based service with the third terminal based on the target ranging capacity information. On the other hand, since the sent third message already contains the ranging capacity information of the third terminal, for example, the ranging capacity information of the third terminal is the ranging capacity information supported by the third terminal, the fourth terminal that has received the third message already knows the ranging capacity information supported by the third terminal, so when the third terminal subsequently changes the ranging capacity information to be used, it is not necessary to carry the ranging capacity information of the third terminal in the sent message, but it only needs to carry the indication identifier. For the fourth terminal that has received the third message, it may determine what ranging capacity information will be used by the third terminal according to the indication identifier newly received. In this way, it is beneficial to reduce the amount of information carried by the message sent by the third terminal and save communication resources.

FIG. 12 is a schematic flow chart showing a ranging capacity receiving method according to an embodiment of the present disclosure. The method described in this embodiment may be applied to a fourth terminal. The fourth terminal includes, but is not limited to, an electronic device such as a mobile phone, a tablet computer, a wearable device, a sensor, and an Internet of Things device, etc. A third terminal mentioned in the following embodiments may be the third terminal to which the above-mentioned ranging capacity sending method is applied.

As shown in FIG. 12, the ranging capacity receiving method may include a step S401.

In step S401, a third message sent by a third terminal is received, and the third message includes ranging capacity information of the third terminal.

In an embodiment, after receiving the ranging capacity information of the third terminal, the fourth terminal may determine that the third terminal can perform a ranging-based service, and may also determine which ranging capacity information the third terminal supports according to the ranging capacity information of the third terminal, so that when needs to perform the ranging-based service with the third terminal subsequently, the fourth terminal may select the ranging capacity information supported by the third terminal from the ranging capacity information of the fourth terminal to perform the ranging-based service with the third terminal.

According to embodiments of the present disclosure, the third terminal sends the third message carrying the ranging capacity information of the third terminal, through which the fourth terminal that can support the ranging-based service nearby the third terminal may not only determine that the third terminal can perform the ranging-based service, but also determine which ranging capacity information the third terminal supports according to the ranging capacity information of the third terminal, and then determine which ranging capacity to be used subsequently to perform the ranging-based service with the third terminal, so as to perform the ranging-based service with the third terminal.

Optionally, the ranging capacity information includes at least one of the following: a ranging process used when performing a ranging service, an object ranged when performing a ranging service, or a ranging accuracy when performing a ranging service.

FIG. 13 is a schematic flow chart showing a ranging capacity receiving method according to embodiments of the present disclosure. As shown in FIG. 13, the method further includes a step S402.

In step S402, it is determined whether to perform a ranging-based service with the third terminal according to the ranging capacity information of the third terminal.

In an embodiment, after receiving the ranging capacity information of the third terminal, the fourth terminal may determine whether to perform the ranging-based service with the third terminal according to the ranging capacity information of the third terminal. For example, the fourth terminal may compare the ranging capacity information of the third terminal with the ranging capacity information of the fourth terminal, and then determine whether to perform the ranging-based service with the third terminal based on a comparison result.

FIG. 14 is a schematic flow chart showing a ranging capacity receiving method according to embodiments of the present disclosure. As shown in FIG. 14, determining whether to perform the ranging-based service with the third terminal according to the ranging capacity information of the third terminal includes a step S4021.

In step S4021, it is determined to perform the ranging-based service with the third terminal in response to ranging capacity information of the fourth terminal completely matching the ranging capacity information of the third terminal; or it is determined to perform the ranging-based service with the third terminal in response to the ranging capacity information of the fourth terminal partially matching the ranging capacity information of the third terminal.

In an embodiment, the fourth terminal may compare the ranging capacity information of the third terminal with the ranging capacity information of the fourth terminal, and determine a matching degree between the ranging capacity information of the third terminal and the ranging capacity information of the fourth terminal according to a comparison result.

The fourth terminal may determine to perform the ranging-based service with the third terminal in the case where the ranging capacity information of the third terminal completely matches the ranging capacity information of the fourth terminal. The fourth terminal may also determine to perform the ranging-based service with the third terminal in the case where the ranging capacity information of the third terminal partially matches the ranging capacity information of the fourth terminal.

In an embodiment, the fourth terminal may determine not to perform the ranging-based service with the third terminal in the case where the ranging capacity information of the third terminal is completely different from the ranging capacity information of the fourth terminal, and/or the fourth terminal may generate prompt information and send the prompt information to the third terminal to prompt the third terminal that the ranging capacity information of the third terminal is completely different from the ranging capacity information of the fourth terminal, so that the third terminal may determine the reason why the fourth terminal does not perform the ranging-based service with the third terminal is that the ranging capacity information of the third terminal is completely different from the ranging capacity information of the fourth terminal.

Figure 15:
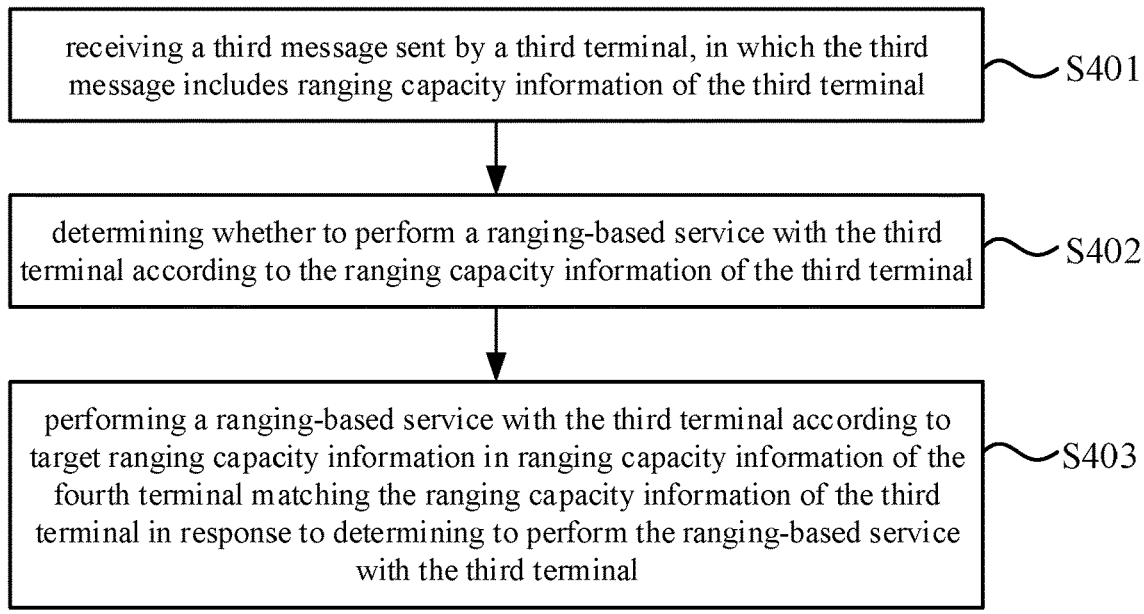
FIG. 15 is a schematic flow chart showing a ranging capacity receiving method according to embodiments of the present disclosure.

FIG. 15 is a schematic flow chart showing a ranging capacity receiving method according to embodiments of the present disclosure. As shown in FIG. 15, the method further includes a step S403.

In step S403, a ranging-based service with the third terminal is performed according to target ranging capacity information in ranging capacity information of the fourth terminal matching the ranging capacity information of the third terminal in response to determining to perform the ranging-based service with the third terminal.

In an embodiment, when the fourth terminal determines to perform the ranging-based service with the third terminal, the fourth terminal may perform the ranging-based service with the third terminal according to the target ranging capacity information in the ranging capacity information of the third terminal matching the ranging capacity information of the fourth terminal.

For example, the ranging capacity information of the third terminal includes that the ranging process is the one way process, the ranged object is the distance, and the ranging accuracy is centimeter. The ranging capacity information of the fourth terminal includes that the ranging process is the two way process, the ranged object is the distance, and the ranging accuracy is millimeters. It may be determined that the ranging capacity information of the fourth terminal partially matches the ranging capacity information of the third terminal, that is, the ranged object of the fourth terminal matches the ranged object of the third terminal, both being the distance.

In this case, if the fourth terminal determines to perform the ranging-based service with the third terminal, the fourth terminal may perform the ranging-based service with the third terminal according to the target ranging capacity information (i.e., the ranged object being the distance) in the ranging capacity information of the third terminal matching the ranging capacity information of the fourth terminal. Therefore, when the fourth terminal performs the ranging-based service, the fourth terminal may measure a distance with the third terminal based on the ranging. Different ranging capacity information regarding such as the ranging process and the ranging accuracy may be determined by negotiation between the fourth terminal and the third terminal through their flows thereof.

Optionally, the third message further includes an indication identifier, and the indication identifier is configured to indicate ranging capacity information to be used by the third terminal in the ranging capacity information of the third terminal.

In an embodiment, the third message may include the ranging capacity information of the third terminal and the indication identifier in addition to the request information. The indication identifier may indicate the ranging capacity information to be used by the third terminal in the ranging capacity information of the third terminal.

For example, the ranging capacity information of the third terminal is all ranging capacity information supported by the third terminal. For example, the ranged object supported by the third terminal include the distance and the angle, but the ranged object required by the ranging service to be performed by the third terminal is distance, then the third terminal may use a third identifier to indicate that, among the distance and the angle, the ranging capacity information to be used by the third terminal is the distance.

Figure 16:
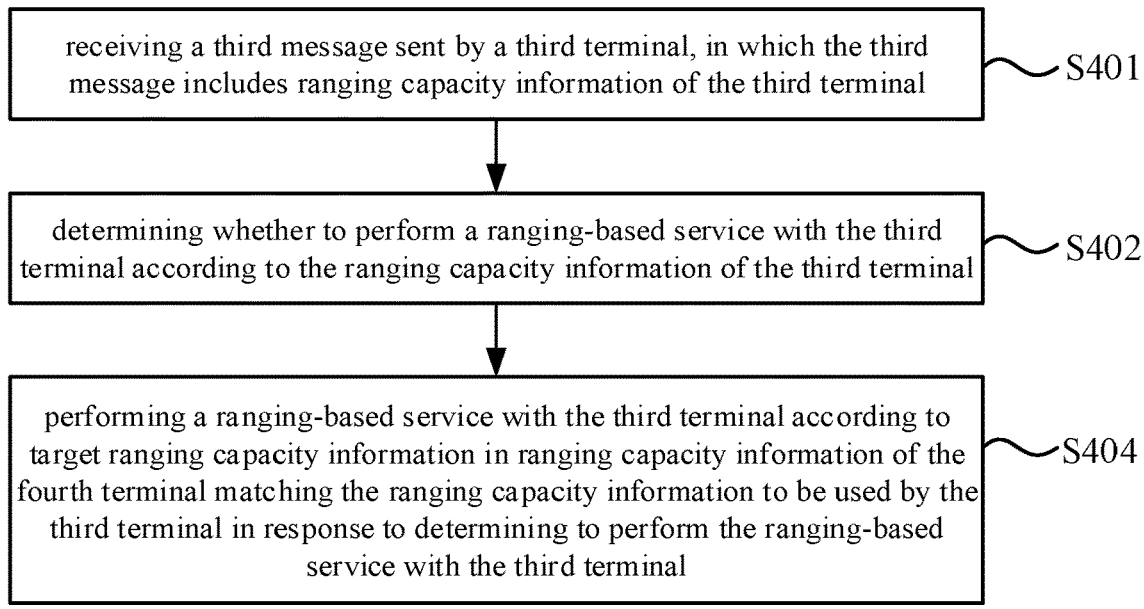
FIG. 16 is a schematic flow chart showing a ranging capacity receiving method according to embodiments of the present disclosure.

FIG. 16 is a schematic flow chart showing a ranging capacity receiving method according to embodiments of the present disclosure. As shown in FIG. 16, the method further includes a step S404.

In step S404, a ranging-based service with the third terminal is performed according to target ranging capacity information in the ranging capacity information of the fourth terminal matching the ranging capacity information to be used by the third terminal in response to determining to perform the ranging-based service with the third terminal.

Accordingly, after receiving the third message, the fourth terminal may determine the ranging capacity information to be used by the third terminal in the ranging capacity information of the third terminal according to the indication identifier in the third message, so that when performing the ranging-based service with the third terminal subsequently, the fourth terminal may adopt the target ranging capacity information that matches the ranging capacity information to be used by the third terminal in the ranging capacity information of the fourth terminal to perform the ranging-based service with the third terminal to ensure the ranging-based service proceed smoothly.

On the one hand, the fourth terminal can subsequently perform the ranging-based service with the third terminal based on the target ranging capacity information. On the other hand, since the sent third message already contains the ranging capacity information of the third terminal, for example, the ranging capacity information of the third terminal is the ranging capacity information supported by the third terminal, the fourth terminal that has received the third message already knows the ranging capacity information supported by the third terminal, so when the third terminal subsequently changes the ranging capacity information to be used, it is not necessary to carry the ranging capacity information of the third terminal in the sent message, but it only needs to carry the indication identifier. For the fourth terminal that has received the third message, it may determine what ranging capacity information will be used by the third terminal according to the indication identifier newly received. In this way, it is beneficial to reduce the amount of information carried by the message sent by the third terminal and save communication resources.

Embodiments of the present disclosure provides a ranging capacity request apparatus, which is applied to a first terminal. The apparatus includes a sending module configured to send a first message, the first message includes request information, and the request information is configured to request for ranging capacity information of a second terminal that has received the request information.

Figure 17:
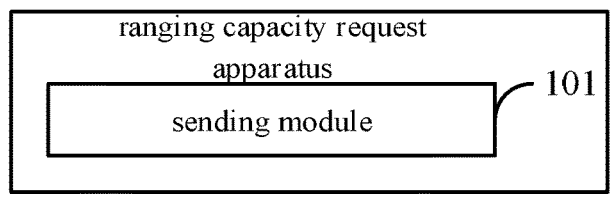
FIG. 17 is a schematic block diagram showing a ranging capacity request apparatus according to embodiments of the present disclosure.

FIG. 17 is a schematic block diagram showing a ranging capacity request apparatus according to an embodiment of the present disclosure. The apparatus described in this embodiment may be applied to a first terminal. The first terminal includes, but is not limited to, an electronic device such as a mobile phone, a tablet computer, a wearable device, a sensor, and an Internet of Things device, etc. A second terminal mentioned in the following embodiments may be a second terminal to which a ranging capacity sending apparatus described subsequently is applied.

The first terminal may perform a ranging-based service, and the ranging-based service includes, but is not limited to, measuring a distance relative to other terminal(s), measuring an angle relative to other terminal(s), measuring a distance and an angle relative to other terminal(s), and measuring a relative position with other terminal(s), etc.

However, to perform the ranging-based service, other device(s) is/are required to participate, so the first terminal needs to first discover other device(s) nearby that can also perform the ranging-based service. Based on the following embodiments, the first terminal can discover other device(s) nearby that can also perform the ranging-based service, such as the second terminal. In the ranging-based service, the first terminal may be referred to as a discovery device, or a broadcast announcing device, and the second terminal may be referred to as a discoveree device, or a monitoring/listening device.

As shown in FIG. 17, the ranging capacity request apparatus includes a sending module 101.

The sending module 101 is configured to send a first message, the first message includes request information, and the request information is configured to request for ranging capacity information of a second terminal that has received the request information.

Optionally, the ranging capacity information includes at least one of the following: a ranging apparatus used when performing a ranging service, an object ranged when performing a ranging service, or a ranging accuracy when performing a ranging service.

Figure 18:
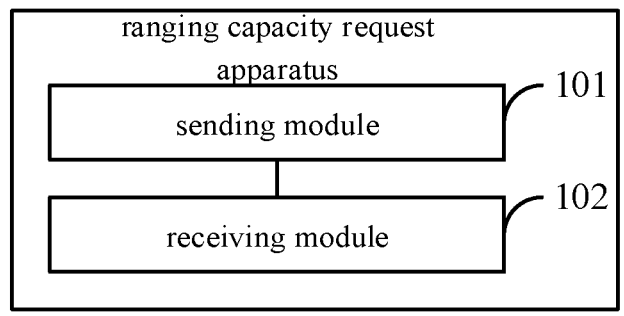
FIG. 18 is a schematic block diagram showing a ranging capacity request apparatus according to embodiments of the present disclosure.

FIG. 18 is a schematic block diagram showing a ranging capacity request apparatus according to embodiments of the present disclosure. As shown in FIG. 18, the apparatus further includes a receiving module 102.

The receiving module 102 is configured to receive a second message sent by the second terminal, and the second message includes the ranging capacity information of the second terminal.

Figure 19:
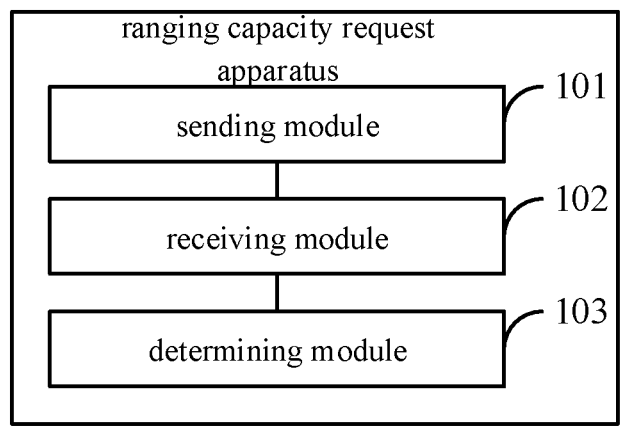
FIG. 19 is a schematic block diagram showing a ranging capacity request apparatus according to embodiments of the present disclosure.

FIG. 19 is a schematic block diagram showing a ranging capacity request apparatus according to embodiments of the present disclosure. As shown in FIG. 19, the apparatus further includes a determining module 103.

The determining module 103 is configured to determine whether to perform a ranging-based service with the second terminal according to the ranging capacity information of the second terminal.

Optionally, the determining module is configured to: determine to perform the ranging-based service with the second terminal in response to the ranging capacity information of the second terminal completely matching ranging capacity information of the first terminal; or determine to perform the ranging-based service with the second terminal in response to the ranging capacity information of the second terminal partially matching ranging capacity information of the first terminal.

Figure 20:
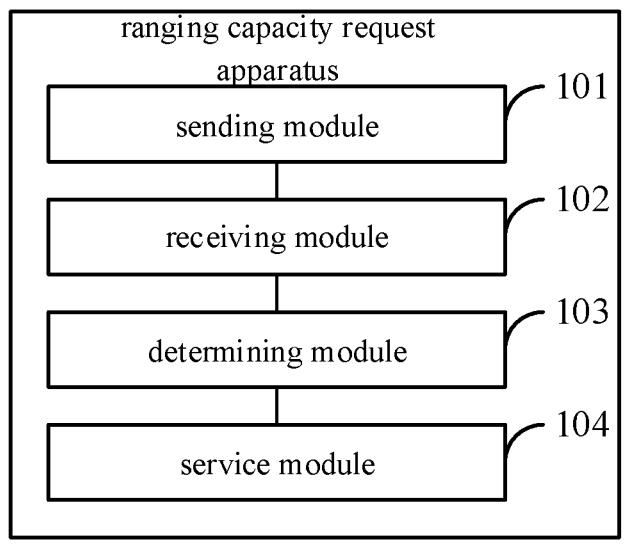
FIG. 20 is a schematic block diagram showing a ranging capacity request apparatus according to embodiments of the present disclosure.

FIG. 20 is a schematic block diagram showing a ranging capacity request apparatus according to embodiments of the present disclosure. As shown in FIG. 20, the apparatus further includes a service module 104.

The service module 104 is configured to perform the ranging-based service with the second terminal according to target ranging capacity information in the ranging capacity information of the second terminal matching the ranging capacity information of the first terminal.

Optionally, the first message further includes ranging capacity information of the first terminal.

The ranging capacity information of the second terminal includes target ranging capacity information in the ranging capacity information of the second terminal that matches the ranging capacity information of the first terminal.

Optionally, the first message further includes ranging capacity information of the first terminal and an indication identifier, and the indication identifier is configured to indicate ranging capacity information to be used by the first terminal in the ranging capacity information of the first terminal.

The ranging capacity information of the second terminal includes target ranging capacity information in the ranging capacity information of the second terminal that matches the ranging capacity information to be used by the first terminal.

Embodiments of the present disclosure also provides a ranging capacity sending apparatus, which is applied to a second terminal. The apparatus includes a sending module configured to send a second message, and the second message includes ranging capacity information of the second terminal.

The present disclosure also provide a ranging capacity sending apparatus. The apparatus described in embodiments of the present disclosure may be applied to a second terminal. The second terminal includes, but is not limited to, an electronic device such as a mobile phone, a tablet computer, a wearable device, a sensor, an Internet of Things device, etc. A first terminal mentioned in the following embodiments may be the first terminal to which the above-mentioned ranging capacity request apparatus is applied.

The ranging capacity sending apparatus may include a sending module.

The sending module is configured to send a second message, and the second message includes ranging capacity information of the second terminal.

In an embodiment, the second terminal may communicate with the first terminal to which the above-mentioned ranging capacity request method is applied, for example, may receive a first message sent by the first terminal, in which the first message includes request information, and the request information is configured to request for ranging capacity information of the second terminal that has received the request information, and then send the second message, specifically, send the second message to the first terminal.

In an embodiment, the second terminal may communicate with a fourth terminal to which the ranging capacity receiving method described above is applied. In this case, the second terminal is referred to as a third terminal in order to distinguish from the above-mentioned communication between the second terminal and the first terminal.

Optionally, the second message further includes an indication identifier, and the indication identifier is configured to indicate ranging capacity information to be used by the second terminal in the ranging capacity information of the second terminal. In the case where the second terminal is the third terminal and the second message is a third message, the third message further includes an indication identifier, and the indication identifier is configured to indicate ranging capacity information to be used by the third terminal in the ranging capacity information of the third terminal.

Taking the communication between the second terminal and the first terminal as an example, the second terminal, as a discoveree device, may receive the first message sent by the first terminal. A communication process with the first terminal may be as shown in FIG. 6, which is a schematic flow chart showing a ranging capacity sending method according to embodiments of the present disclosure.

Figure 21:
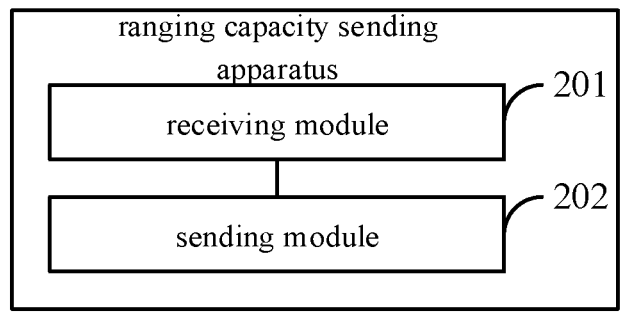
FIG. 21 is a schematic block diagram showing a ranging capacity sending apparatus according to embodiments of the present disclosure.

FIG. 21 is a schematic block diagram showing a ranging capacity sending apparatus according to embodiments of the present disclosure As shown in FIG. 21, the ranging capacity sending apparatus may include a receiving module 201, and a sending module 202.

The receiving module 201 is configured to receive a first message sent by a first terminal, the first message includes request information, and the request information is configured to request for the ranging capacity information of the second terminal that has received the request information.

The sending module 202 is configured to send the ranging capacity information of the second terminal to the first terminal.

Optionally, the ranging capacity information includes at least one of the following: a ranging apparatus used when performing a ranging service, an object ranged when performing a ranging service, or a ranging accuracy when performing a ranging service.

Optionally, the first message further includes ranging capacity information of the first terminal, and the sending module is configured to send the ranging capacity information of the second terminal to the first terminal in response to the ranging capacity information of the second terminal completely matching ranging capacity information of the first terminal; or send a part of the ranging capacity information of the second terminal that matches ranging capacity information of the first terminal to the first terminal in response to the ranging capacity information of the second terminal partially matching the ranging capacity information of the first terminal.

Figure 22:
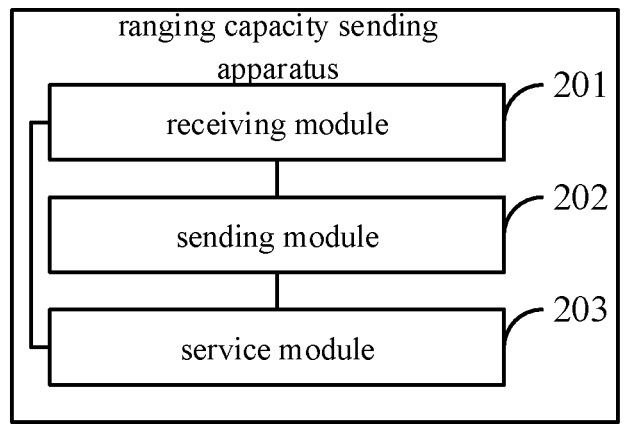
FIG. 22 is a schematic block diagram showing a ranging capacity sending apparatus according to embodiments of the present disclosure.

FIG. 22 is a schematic block diagram showing a ranging capacity sending apparatus according to embodiments of the present disclosure. As shown in FIG. 22, the apparatus further includes a service module 203.

The service module 203 is configured to perform a ranging-based service with the first terminal according to target ranging capacity information in the ranging capacity information of the second terminal matching the ranging capacity information of the first terminal.

Optionally, the first message further includes ranging capacity information of the first terminal, and the sending module is configured to determine target ranging capacity information in the ranging capacity information of the second terminal that matches the ranging capacity information of the first terminal; and send the target ranging capacity information determined to the first terminal.

Optionally, the first message further includes ranging capacity information of the first terminal and an indication identifier, and the indication identifier is configured to indicate ranging capacity information to be used by the first terminal in the ranging capacity information of the first terminal. The sending module is configured to: determine the ranging capacity information to be used by the first terminal in the ranging capacity information of the first terminal according to the indication identifier; determine target ranging capacity information in the ranging capacity information of the second terminal that matches the ranging capacity information to be used by the first terminal; and send the target ranging capacity information determined to the first terminal.

Figure 23:
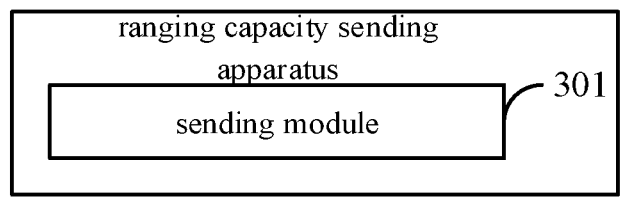
FIG. 23 is a schematic block diagram showing a ranging capacity sending apparatus according to embodiments of the present disclosure.

In some embodiments, the second terminal is referred to as a third terminal, and the second message sent by the second terminal is referred to as a third message, and in the communication between the third terminal and a fourth terminal, the third terminal may be used as a discoveree device, and the third message may include ranging capacity information of the third terminal. FIG. 23 is a schematic block diagram showing a ranging capacity sending apparatus according to embodiments of the present disclosure.

In the case where the third terminal can perform a ranging-based service, the ranging-based service include, but is not limited to, measuring a distance relative to other terminal(s), measuring an angle relative to other terminal(s), measuring a distance and an angle relative to other terminal(s), and measuring a relative position with other terminal(s), etc.

However, to perform the ranging-based service, other device(s) is/are required to participate, so the third terminal needs to be first discovered by other device(s) nearby that can also perform the ranging-based service. Based on the following embodiments, the third terminal may enable other device(s) nearby (e.g., the fourth terminal) that can perform the ranging-based service to discover the third terminal by sending its own ranging capacity information. In the ranging-based service, the third terminal may be referred to as a discoveree device, and the fourth terminal may be referred to as a discovery device.

As shown in FIG. 23, the ranging capacity sending apparatus may include a sending module 301.

The sending module 301 is configured to send a third message, and the third message includes ranging capacity information of the third terminal.

Optionally, the ranging capacity information includes at least one of the following: a ranging apparatus used when performing a ranging service, an object ranged when performing a ranging service, or a ranging accuracy when performing a ranging service.

Optionally, the third message further includes an indication identifier, and the indication identifier is configured to indicate ranging capacity information to be used by the third terminal in the ranging capacity information of the third terminal.

Embodiments of the present disclosure also provide a ranging capacity receiving apparatus, which is applied to a fourth terminal. The apparatus includes a receiving module configured to receive a third message sent by a third terminal, and the third message includes ranging capacity information of the third terminal.

Figure 24:
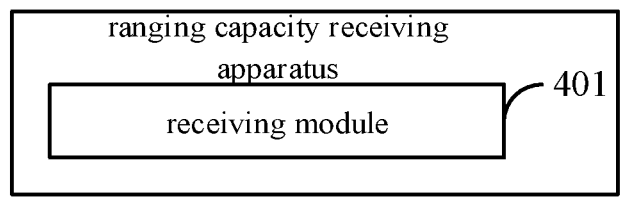
FIG. 24 is a schematic block diagram showing a ranging capacity receiving apparatus according to embodiments of the present disclosure.

FIG. 24 is a schematic block diagram showing a ranging capacity receiving apparatus according to an embodiment of the present disclosure. The apparatus described in this embodiment may be applied to a fourth terminal. The fourth terminal includes, but is not limited to, an electronic device such as a mobile phone, a tablet computer, a wearable device, a sensor, and an Internet of Things device, etc. A third terminal mentioned in the following embodiments may be the third terminal to which the above-mentioned ranging capacity sending apparatus is applied.

As shown in FIG. 24, the ranging capacity receiving apparatus may include a receiving module 401.

The receiving module 401 is configured to receive a third message sent by a third terminal, and the third message includes ranging capacity information of the third terminal.

Optionally, the ranging capacity information includes at least one of the following: a ranging apparatus used when performing a ranging service, an object ranged when performing a ranging service, or a ranging accuracy when performing a ranging service.

Figure 25:
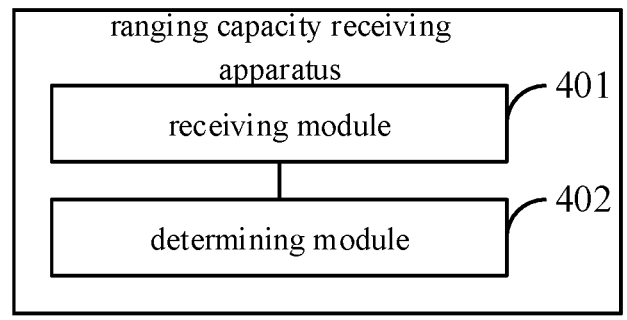
FIG. 25 is a schematic block diagram showing a ranging capacity receiving apparatus according to embodiments of the present disclosure.

FIG. 25 is a schematic block diagram showing a ranging capacity receiving apparatus according to embodiments of the present disclosure. As shown in FIG. 25, the apparatus further includes a determining module 402.

The determining module 402 is configured to determine whether to perform a ranging-based service with the third terminal according to the ranging capacity information of the third terminal.

Optionally, the determining module is configured to: determine to perform the ranging-based service with the third terminal in response to ranging capacity information of the fourth terminal completely matching the ranging capacity information of the third terminal; or determine to perform the ranging-based service with the third terminal in response to ranging capacity information of the fourth terminal partially matching the ranging capacity information of the third terminal.

Figure 26:
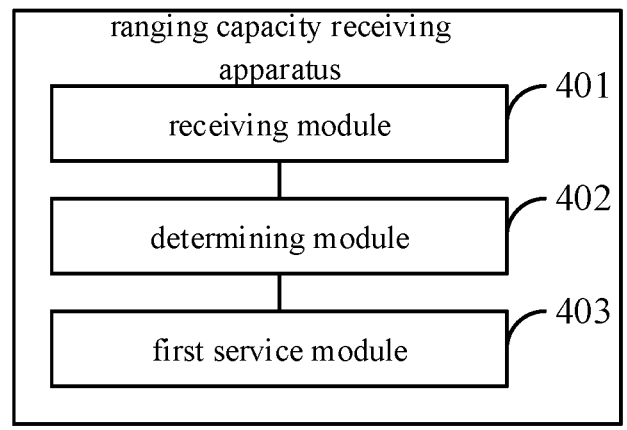
FIG. 26 is a schematic block diagram showing a ranging capacity receiving apparatus according to embodiments of the present disclosure.

FIG. 26 is a schematic block diagram showing a ranging capacity receiving apparatus according to embodiments of the present disclosure. As shown in FIG. 26, the apparatus further includes a first service module 403.

The first service module 403 is configured to perform a ranging-based service with the third terminal according to target ranging capacity information in the ranging capacity information of the fourth terminal matching the ranging capacity information of the third terminal in response to determining to perform the ranging-based service with the third terminal.

Optionally, the third message further includes an indication identifier, and the indication identifier is configured to indicate ranging capacity information to be used by the third terminal in the ranging capacity information of the third terminal.

Figure 27:
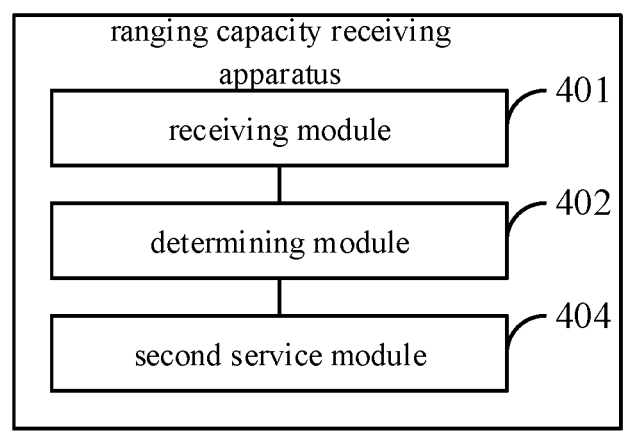
FIG. 27 is a schematic block diagram showing a ranging capacity receiving apparatus according to embodiments of the present disclosure.

FIG. 27 is a schematic block diagram showing a ranging capacity receiving apparatus according to embodiments of the present disclosure. As shown in FIG. 27, the apparatus further includes a second service module 404.

The second service module 404 is configured to perform a ranging-based service with the third terminal according to target ranging capacity information in the ranging capacity information of the fourth terminal matching the ranging capacity information to be used by the third terminal in response to determining to perform the ranging-based service with the third terminal.

With respect to the apparatuses in the above embodiments, the specific implementations of operations performed by individual modules therein have been described in detail in the embodiments of the relevant methods, which will not be elaborated herein.

Since the apparatus embodiments substantially correspond to the method embodiments, reference can be made to the relevant description of the method embodiments. The above-described apparatus embodiments are merely for the purpose of illustration, in which the modules described as separate components may be or may not be physically separated, and the components displayed as modules may be or may not be physical modules, that is, either located at one place or distributed onto a plurality of network modules. Some or all of the modules may be selected to achieve the object of embodiments of the present disclosure in accordance with practical requirements. It would be appreciated and executable by those skilled in the art without creative efforts.

Embodiments of the present disclosure also provide an electronic device, including a processor; and a memory for storing instructions executable by the processor. The processor is configured to implement the ranging capacity request method described in any one of the above-mentioned embodiments, and/or the ranging capacity sending method described in any one of the above-mentioned embodiments, and/or the ranging capacity receiving method described in any one of the above-mentioned embodiments.

Embodiments of the present disclosure further provide a computer-readable storage medium having stored therein computer programs that, when executed by a processor, cause the steps in the ranging capacity request method described in any one of the above-mentioned embodiments, and/or the ranging capacity sending method described in any one of the above-mentioned embodiments, and/or the ranging capacity receiving method described in any one of the above-mentioned embodiments to be implemented.

Figure 28:
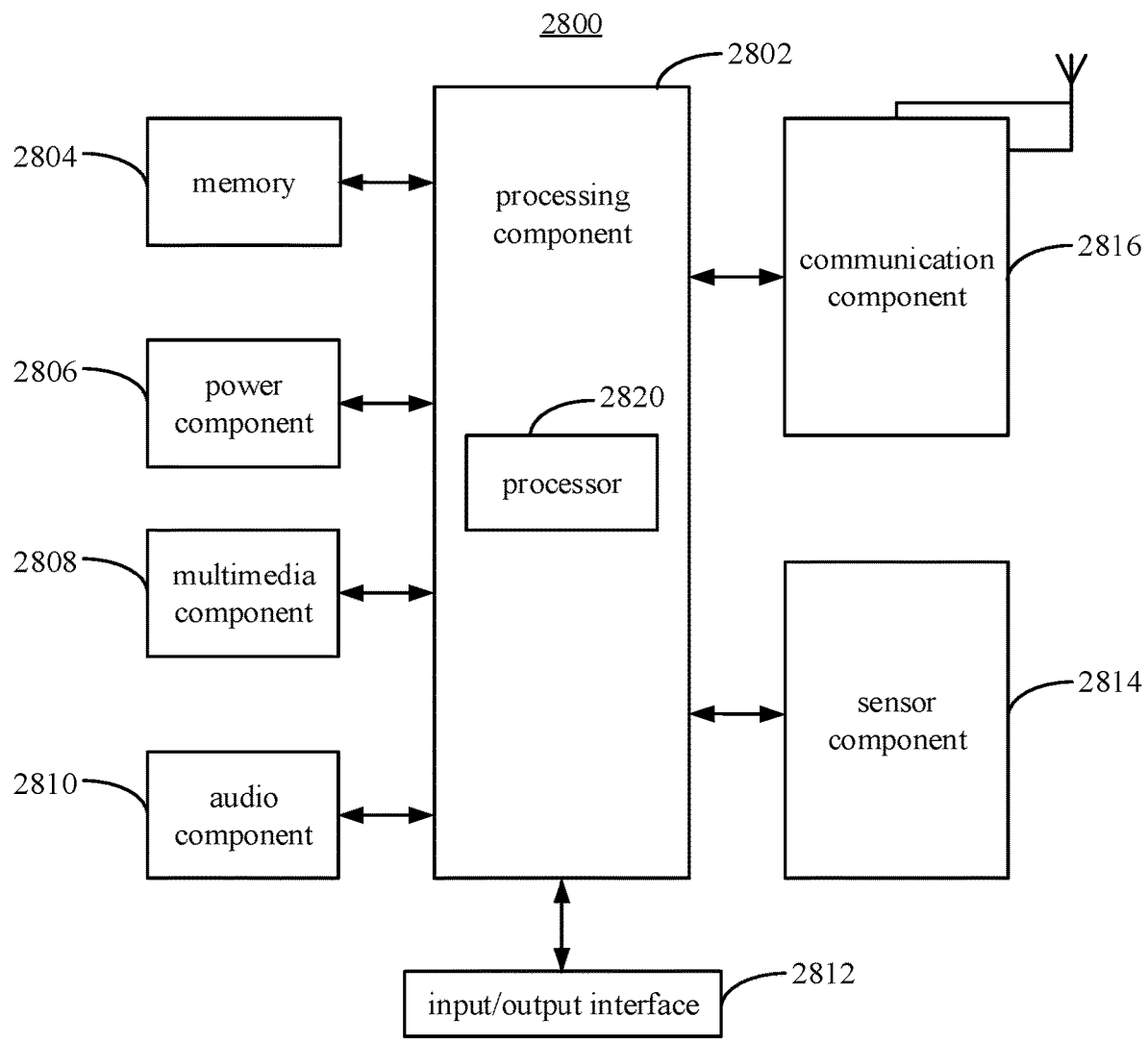
FIG. 28 is a schematic block diagram showing an apparatus for a ranging capacity request method, and/or a ranging capacity sending method, and/or a ranging capacity receiving method according to embodiments of the present disclosure.

FIG. 28 is a schematic block diagram showing an apparatus 2800 for a ranging capacity request method, and/or a ranging capacity sending method, and/or a ranging capacity receiving method according to embodiments of the present disclosure. For example, the apparatus 2800 may be a mobile phone, a computer, a digital broadcast terminal, a messaging device, a game console, a tablet device, a medical device, a fitness device, a personal digital assistant, or the like.

Referring to FIG. 28, the apparatus 2800 may include one or more of the following components: a processing component 2802, a memory 2804, a power component 2806, a multimedia component 2808, an audio component 2810, an input/output (I/O) interface 2812, a sensor component 2814, and a communication component 2816.

The processing component 2802 typically controls overall operations of the apparatus 2800, such as the operations associated with display, phone calls, data communications, camera operations, and recording operations. The processing component 2802 can include one or more processors 2820 to execute instructions to perform all or some of the steps in the above-described methods. Moreover, the processing component 2802 may include one or more modules which facilitate the interaction between the processing component 2802 and other components. For instance, the processing component 2802 may include a multimedia module to facilitate the interaction between the multimedia component 2808 and the processing component 2802.

The memory 2804 is configured to store various types of data to support the operation of the apparatus 2800. Examples of such data include instructions for any applications or methods operated on the apparatus 2800, contact data, phonebook data, messages, pictures, videos, etc. The memory 2804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2806 provides power to various components of the apparatus 2800. The power component 2806 may include a power management system, one or more power sources, and any other components associated with the generation, management, and distribution of power in the apparatus 2800.

The multimedia component 2808 includes a screen providing an output interface between the apparatus 2800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2808 includes a front camera and/or a rear camera. The front camera and/or the rear camera may receive an external multimedia datum while the apparatus 2800 is in an operation mode, such as a photographing mode or a video mode. Each of the front camera and the rear camera may be a fixed optical lens system or have focus and optical zoom capability.

The audio component 2810 is configured to output and/or input audio signals. For example, the audio component 2810 includes a microphone (MIC) configured to receive an external audio signal when the apparatus 2800 is in an operation mode, such as a call mode, a recording mode, and a voice recognition mode. The received audio signal may be further stored in the memory 2804 or transmitted via the communication component 2816. In some embodiments, the audio component 2810 further includes a speaker to output audio signals.

The I/O interface 2812 provides an interface between the processing component 2802 and peripheral interface modules, such as keyboards, click wheels, buttons, and the like. The buttons may include, but are not limited to, a home button, a volume button, a starting button, and a locking button.

The sensor component 2814 includes one or more sensors to provide status assessments of various aspects of the apparatus 2800. For instance, the sensor component 2814 may detect an open/closed status of the apparatus 2800, relative positioning of components, e.g., the display and the keypad, of the apparatus 2800, a change in position of the apparatus 2800 or a component of the apparatus 2800, a presence or absence of user contact with the apparatus 2800, an orientation or an acceleration/deceleration of the apparatus 2800, and a change in temperature of the apparatus 2800. The sensor component 2814 may include a proximity sensor configured to detect the presence of nearby objects without any physical contact. The sensor component 2814 may further include a light sensor, such as a CMOS or CCD image sensor, for use in imaging applications. In some embodiments, the sensor component 2814 may further include an accelerometer sensor, a gyroscope sensor, a magnetic sensor, a pressure sensor, or a temperature sensor.

The communication component 2816 is configured to facilitate communication, wired or wireless, between the apparatus 2800 and other device(s). The apparatus 2800 can access a wireless network based on a communication standard, such as WiFi, 2G, 3G, 4G LTE, 5G NR or a combination thereof. In an illustrative embodiment, the communication component 2816 receives a broadcast signal or broadcast associated information from an external broadcast management system via a broadcast channel. In an illustrative embodiment, the communication component 2816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 2800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 2804, executable by the processor 2820 in the apparatus 2800, for completing the above-mentioned methods. For example, the non-transitory computer-readable storage medium may be a ROM, a random access memory (RAM), a CD-ROM, a magnetic tape, a floppy disc, an optical data storage device, and the like.

According to embodiments of the present disclosure, by sending the first message carrying the request information, the first terminal may not only determine which terminals nearby can perform the ranging-based service, but also enable the second terminal that supports the ranging-based service to send the ranging capacity information of the second terminal to the first terminal, such that the first terminal may determine, according to the ranging capacity information, which ranging capacity to be used subsequently to perform the ranging-based service with the second terminal, so as to perform the ranging-based service with the second terminal.

According to embodiments of the present disclosure, the third terminal sends the third message carrying the ranging capacity information of the third terminal, through which the fourth terminal that can support the ranging-based service nearby the third terminal may not only determine that the third terminal can perform the ranging-based service, but also determine which ranging capacity information the third terminal supports according to the ranging capacity information of the third terminal, and then determine which ranging capacity to be used subsequently to perform the ranging-based service with the third terminal, so as to perform the ranging-based service with the third terminal.

Other embodiments of the disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to, the exact construction that has been described above and illustrated in the accompanying drawings, and that various modifications and changes can be made without departing from the scope thereof. It is intended that the scope of the disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and apparatuses provided by the embodiments of the present disclosure have been described in detail above, and specific examples are used to illustrate the principles and implementations of the present disclosure. The description of the above embodiments is only used to help understand the methods and core ideas of the present disclosure, and some changes may be made by those skilled in the art in the specific implementation and application scope according to the idea of the present disclosure. In summary, the content of the specification should not be construed as a limitation on the present disclosure.

What is claimed is:

1. A ranging capacity request method, performed by a first terminal, comprising:
 sending a first message, wherein the first message comprises request information, and the request information is configured to request for ranging capacity information of a second terminal that has received the request information, and the first message further comprises an identifier of a target application, the target application in the first terminal initiates a ranging-based service, and the first terminal has a ranging capacity.

2. The method of claim 1, further comprising:
 receiving a second message sent by the second terminal, wherein the second message comprises the ranging capacity information of the second terminal, and
 determining whether to perform a ranging-based service with the second terminal according to the ranging capacity information of the second terminal,
 wherein the ranging capacity information comprises at least one of the following: a ranging process used when performing a ranging service, an object ranged when performing a ranging service, or a ranging accuracy when performing a ranging service.

3. The method of claim 2, wherein determining whether to perform the ranging-based service with the second terminal according to the ranging capacity information of the second terminal comprises:
 determining to perform the ranging-based service with the second terminal in response to the ranging capacity information of the second terminal completely matching ranging capacity information of the first terminal; or
 determining to perform the ranging-based service with the second terminal in response to the ranging capacity information of the second terminal partially matching ranging capacity information of the first terminal,
 wherein the method further comprises:
 performing the ranging-based service with the second terminal according to target ranging capacity information in the ranging capacity information of the second terminal matching the ranging capacity information of the first terminal.

4. The method of claim 2, wherein the first message further comprises ranging capacity information of the first terminal;
 wherein the ranging capacity information of the second terminal comprises target ranging capacity information in the ranging capacity information of the second terminal that matches the ranging capacity information of the first terminal.

5. The method of claim 2, wherein the first message further comprises ranging capacity information of the first terminal and an indication identifier, and the indication identifier is configured to indicate ranging capacity information to be used by the first terminal in the ranging capacity information of the first terminal;
 wherein the ranging capacity information of the second terminal comprises target ranging capacity information in the ranging capacity information of the second terminal that matches the ranging capacity information to be used by the first terminal.

6. An electronic device, comprising:
a processor; and
a memory for storing instructions executable by the processor;
wherein the processor is configured to implement the ranging capacity request method of claim 1.

7. A non-transitory computer-readable storage medium having stored therein computer programs that, when executed by a processor, cause the processor to perform the ranging capacity request method of claim 1 to be implemented.

8. The method of claim 1, wherein the first terminal is a discovery device, the first message is configured to discover one or more other terminals nearby the first terminal, the ranging-based service includes at least one of: measuring a distance relative to the one or more other terminals, measuring an angle relative to other terminal(s) or measuring a relative position to the one or more other terminals;
receiving a second message sent by the second terminal, wherein the second message comprises the ranging capacity information of the second terminal.

9. A ranging capacity sending method, performed by a second terminal, comprising:
receiving a first message sent by a first terminal, wherein the first message comprises request information, and the request information is configured to request for the ranging capacity information of the second terminal, and the first message further comprises an identifier of a target application, the target application in the first terminal initiates a ranging-based service, and the first terminal has a ranging capacity;
determining, according to the identifier of the target application, that the first terminal is to perform the ranging-based service; and
sending a second message to the first terminal, wherein the second message comprises ranging capacity information of the second terminal.

10. The method of claim 9, wherein the first message further comprises ranging capacity information of the first terminal, and sending the ranging capacity information of the second terminal to the first terminal comprises:
sending the ranging capacity information of the second terminal to the first terminal in response to the ranging capacity information of the second terminal completely matching ranging capacity information of the first terminal; or
sending a part of the ranging capacity information of the second terminal that matches ranging capacity information of the first terminal to the first terminal in response to the ranging capacity information of the second terminal partially matching the ranging capacity information of the first terminal,
wherein the method further comprises:
performing a ranging-based service with the first terminal according to target ranging capacity information in the ranging capacity information of the second terminal matching the ranging capacity information of the first terminal.

11. The method of claim 9, wherein the first message further comprises ranging capacity information of the first terminal, and sending the ranging capacity information of the second terminal to the first terminal comprises:
determining target ranging capacity information in the ranging capacity information of the second terminal that matches the ranging capacity information of the first terminal; and
sending the target ranging capacity information determined to the first terminal.

12. The method of claim 9, wherein the first message further comprises ranging capacity information of the first terminal and an indication identifier, and the indication identifier is configured to indicate ranging capacity information to be used by the first terminal in the ranging capacity information of the first terminal, and
wherein sending the ranging capacity information of the second terminal to the first terminal comprises:
determining the ranging capacity information to be used by the first terminal in the ranging capacity information of the first terminal according to the indication identifier;
determining target ranging capacity information in the ranging capacity information of the second terminal that matches the ranging capacity information to be used by the first terminal; and
sending the target ranging capacity information determined to the first terminal.

13. An electronic device, comprising:
a processor; and
a memory for storing instructions executable by the processor;
wherein the processor is configured to implement the ranging capacity sending method of claim 9.

14. A non-transitory computer-readable storage medium having stored therein computer programs that, when executed by a processor, cause the processor to perform the ranging capacity sending method of claim 9 to be implemented.

15. A ranging capacity receiving method, applied to a first terminal, comprising:
receiving a message sent by a second terminal, wherein the third message comprises ranging capacity information of the second terminal, and the message further comprises an identifier of a target application, the target application in the second terminal initiates a ranging-based service, and the second terminal has a ranging capacity.

16. The method of claim 15, further comprising:
determining whether to perform a ranging-based service with the third second terminal according to the ranging capacity information of the second terminal,
wherein the ranging capacity information comprises at least one of the following: a ranging process used when performing a ranging service, an object ranged when performing a ranging service, or a ranging accuracy when performing a ranging service.

17. The method of claim 16, wherein determining whether to perform the ranging-based service with the second terminal according to the ranging capacity information of the second terminal comprises:
determining to perform the ranging-based service with the second terminal in response to ranging capacity information of the first terminal completely matching the ranging capacity information of the second terminal; or
determining to perform the ranging-based service with the second terminal in response to ranging capacity information of the first terminal partially matching the ranging capacity information of the second terminal,
wherein the method further comprises:
performing a ranging-based service with the second terminal according to target ranging capacity information in ranging capacity information of the first terminal matching the ranging capacity information of the second terminal in response to determining to perform the ranging-based service with the second terminal.

18. The method of claim 16, wherein the second message further comprises an indication identifier, and the indication identifier is configured to indicate ranging capacity information to be used by the second terminal in the ranging capacity information of the second terminal, wherein the method further comprises:

performing a ranging-based service with the second terminal according to target ranging capacity information in ranging capacity information of the first terminal matching the ranging capacity information to be used by the second terminal in response to determining to perform the ranging-based service with the second terminal.

19. An electronic device, comprising:

a processor; and a memory for storing instructions executable by the processor;

wherein the processor is configured to implement the ranging capacity receiving method of claim 15.

20. A non-transitory computer-readable storage medium having stored therein computer programs that, when executed by a processor, cause the processor to perform the ranging capacity receiving method of claim 15 to be implemented.

* * * * *